(12) United States Patent
Koike

(10) Patent No.: US 8,678,975 B2
(45) Date of Patent: Mar. 25, 2014

(54) VEHICLE BRAKING SYSTEM

(75) Inventor: Masaki Koike, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 269 days.

(21) Appl. No.: 13/204,563

(22) Filed: Aug. 5, 2011

(65) Prior Publication Data

US 2012/0031692 A1 Feb. 9, 2012

(30) Foreign Application Priority Data

Aug. 5, 2010 (JP) ................................ 2010-176586

(51) Int. Cl.
*B60W 20/00* (2006.01)

(52) U.S. Cl.
USPC .................. 477/4; 477/94; 477/186; 477/188

(58) Field of Classification Search
USPC .................. 477/4, 94, 184, 186, 188
See application file for complete search history.

(56) References Cited

U.S. PATENT DOCUMENTS

| | | | | |
|---|---|---|---|---|
| 5,318,355 | A * | 6/1994 | Asanuma et al. | 303/3 |
| 5,542,754 | A * | 8/1996 | Aoki et al. | 303/3 |
| 6,021,365 | A * | 2/2000 | Ishii et al. | 701/22 |
| 8,062,175 | B2 * | 11/2011 | Krueger et al. | 477/29 |
| 8,066,616 | B2 * | 11/2011 | Minamikawa | 477/15 |
| 8,147,374 | B2 * | 4/2012 | Yim et al. | 477/4 |
| 2005/0130796 | A1 * | 6/2005 | Loeffler et al. | 477/4 |
| 2008/0167161 | A1 * | 7/2008 | Mitchell et al. | 477/94 |
| 2008/0214352 | A1 * | 9/2008 | Ebner et al. | 477/4 |
| 2009/0118885 | A1 * | 5/2009 | Heap et al. | 701/22 |
| 2010/0106386 | A1 * | 4/2010 | Krasznai et al. | 701/70 |

FOREIGN PATENT DOCUMENTS

| | | |
|---|---|---|
| JP | 10-059150 | 3/1998 |
| JP | 10-211833 | 8/1998 |
| JP | 10-229608 | 8/1998 |
| JP | 4089016 B2 | 1/2000 |
| JP | 2009-6735 A | 1/2009 |
| JP | 2009-113535 A | 5/2009 |
| JP | 2009-179208 A | 8/2009 |

OTHER PUBLICATIONS

Japanese Office Action for corresponding JP Application No. 2010-176586, May 7, 2012.

* cited by examiner

*Primary Examiner* — Roger Pang
(74) *Attorney, Agent, or Firm* — Ditthavong Mori & Steiner, P.C.

(57) ABSTRACT

A vehicle braking system includes an electric motor, an operating amount detector, a brake assist controller, a first braking device and a second braking device. The electric motor drives a driving wheel via a reduction ratio setting device. The first braking device makes the electric motor generate a first braking power under regenerative control. The second braking device generates a second braking power by actuating an actuator with an operating fluid to be pressurized through a hydraulic pressure source. When an initiation condition for a brake assist control is met, the reduction ratio setting device sets a reduction ratio so as to reduce the first braking power and then suspends a change in the reduction ratio, and the first braking device generates the first braking power as well as the second braking device generates the second braking power to produce a target braking power.

10 Claims, 11 Drawing Sheets

US 8,678,975 B2

VEHICLE BRAKING SYSTEM

CROSS-REFERENCES TO RELATED APPLICATIONS

The present application claims priority under 35 U.S.C. §119 to Japanese Patent Application No. 2010-176586, filed Aug. 5, 2010. The contents of this application are incorporated herein by reference in their entirety.

BACKGROUND OF THE INVENTION

1. Field of the Invention

The present invention relates to a vehicle braking system.

2. Discussion of the Background

A hybrid vehicle HV that runs by a combination of a driving motor and an internal combustion engine may be provided with a vehicle braking apparatus which includes a hydraulic brake that converts the operation by a brake operating member, such as a brake pedal, into a fluid pressure, such as an oil pressure, and thereby actuates the brake actuating unit and a regenerative brake that causes the driving motor to act as a generator under regenerative control so as to convert the kinetic energy of a moving vehicle into electrical energy and thereby slows down the vehicle or brings it to a stop. Also, engine braking that uses the retarding forces within the internal combustion engine to slow the vehicle down can be used.

Of these brakes, since the regenerative brake can recover the kinetic energy of the hybrid vehicle HV as electrical energy, the energy efficiency of the hybrid vehicle HV can be improved by making an effective use of the braking power by the regenerative brake.

Motor vehicles including the hybrid vehicle described above have been required to shorten a braking distance associated with, in particular, emergency braking, thus various vehicle braking apparatuses have been proposed.

For example, a braking power control apparatus is disclosed in Japanese Patent No. 4089016, which can produce an optimal braking power, irrespective of the different degree of braking power generated by different operations of the brake pedal during emergency braking.

Also, an emergency braking assistance control apparatus is disclosed in Japanese Unexamined Patent Application Publication No. 10-59150, which produces an assistance braking power in an early stage and thereby prevents a delay in braking operation timing.

In addition, a vehicle braking power control apparatus is disclosed in Japanese Unexamined Patent Application Publication No. 10-211833, which forcedly drives a supplementary booster with a vacuum pressure from a negative pressure source during a sudden braking operation and thereby forcedly boosts a brake fluid pressure from a master cylinder so as to apply a harsh braking.

Furthermore, an electric vehicle braking apparatus is disclosed in Japanese Unexamined Patent Application Publication No. 10-229608, which performs friction braking and regenerative braking, depending on the amount of braking operations when it is determined that a braking power assist associated with a harsh braking is necessary.

Also, Japanese Unexamined Patent Application Publications Nos. 10-59150, 10-211833, and 10-229608 disclose a technology for employing an ABS function to suppress skidding on a low-μ road surface.

Furthermore, Japanese Unexamined Patent Application Publication No. 10-229608 discloses a technology for producing a target braking power with a friction braking power and a regenerative braking power and thereby converting the kinetic energy of an electric vehicle into electrical energy.

SUMMARY OF THE INVENTION

According to an aspect of the present invention, a vehicle braking system includes an electric motor, an operating amount detector, a brake assist controller, a first braking device and a second braking device. The electric motor drives a driving wheel via a reduction ratio setting device. The reduction ratio setting device changes a reduction ratio between the electric motor and the driving wheel. The operating amount detector is configured to detect an amount of operation of a brake operating member. The brake assist controller boosts a braking power based on a target braking power that is set depending on the amount of operation detected by the operating amount detector, when an initiation condition for a brake assist control is met. The first braking device makes the electric motor generate a first braking power under regenerative control. The second braking device generates a second braking power by actuating an actuator with an operating fluid to be pressurized through a hydraulic pressure source. When the initiation condition for the brake assist control is met, the reduction ratio setting device sets the reduction ratio so as to reduce the first braking power and then suspends a change in the reduction ratio, and the first braking device generates the first braking power as well as the second braking device generates the second braking power to produce the target braking power.

According to another aspect of the present invention, a vehicle braking system includes an electric motor, an operating amount detector, a brake assist controller, a first braking device and a second braking device. The electric motor drives a driving wheel via a reduction ratio setting device. The reduction ratio setting device changes a reduction ratio between the electric motor and the driving wheel. The operating amount detector is configured to detect an amount of operation of a brake operating member. The brake assist controller boosts a braking power based on a target braking power that is set depending on the amount of operation detected by the operating amount detector, when an initiation condition for a brake assist control is met. The first braking device makes the electric motor generate a first braking power under regenerative control. The second braking device generates a second braking power by actuating an actuator with an operating fluid to be pressurized through a hydraulic pressure source. When the initiation condition for the brake assist control is met, the reduction ratio setting device sets the reduction ratio so as to increase the first braking power.

According to further aspect of the present invention, a vehicle braking system includes an electric motor, an internal combustion engine, a reduction ratio setting device, a clutch, an operating amount detector, a brake assist controller, a first braking device and a second braking device. The electric motor drives a driving wheel. The internal combustion engine drives the driving wheel. The reduction ratio setting device changes a reduction ratio between the electric motor and the driving wheel and changes a reduction ratio between the internal combustion engine and the driving wheel. The clutch engages and disengages the internal combustion engine and the reduction ratio setting device. The operating amount detector is configured to detect an amount of operation of a brake operating member. The brake assist controller boosts a braking power based on a target braking power that is set depending on the amount of operation detected by an operating amount detector, when an initiation condition for a brake assist control is met. The first braking device makes the electric motor generate a first braking power under regenerative control. The second braking device generates a second braking power by actuating an actuator with an operating fluid to be pressurized through a hydraulic pressure source. When the initiation condition for the brake assist control is met, the first braking device generates the first braking power and the second braking device generates the second braking power so as to produce the target braking power, and the internal combustion engine and the reduction ratio setting device are engaged with each other through the clutch.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
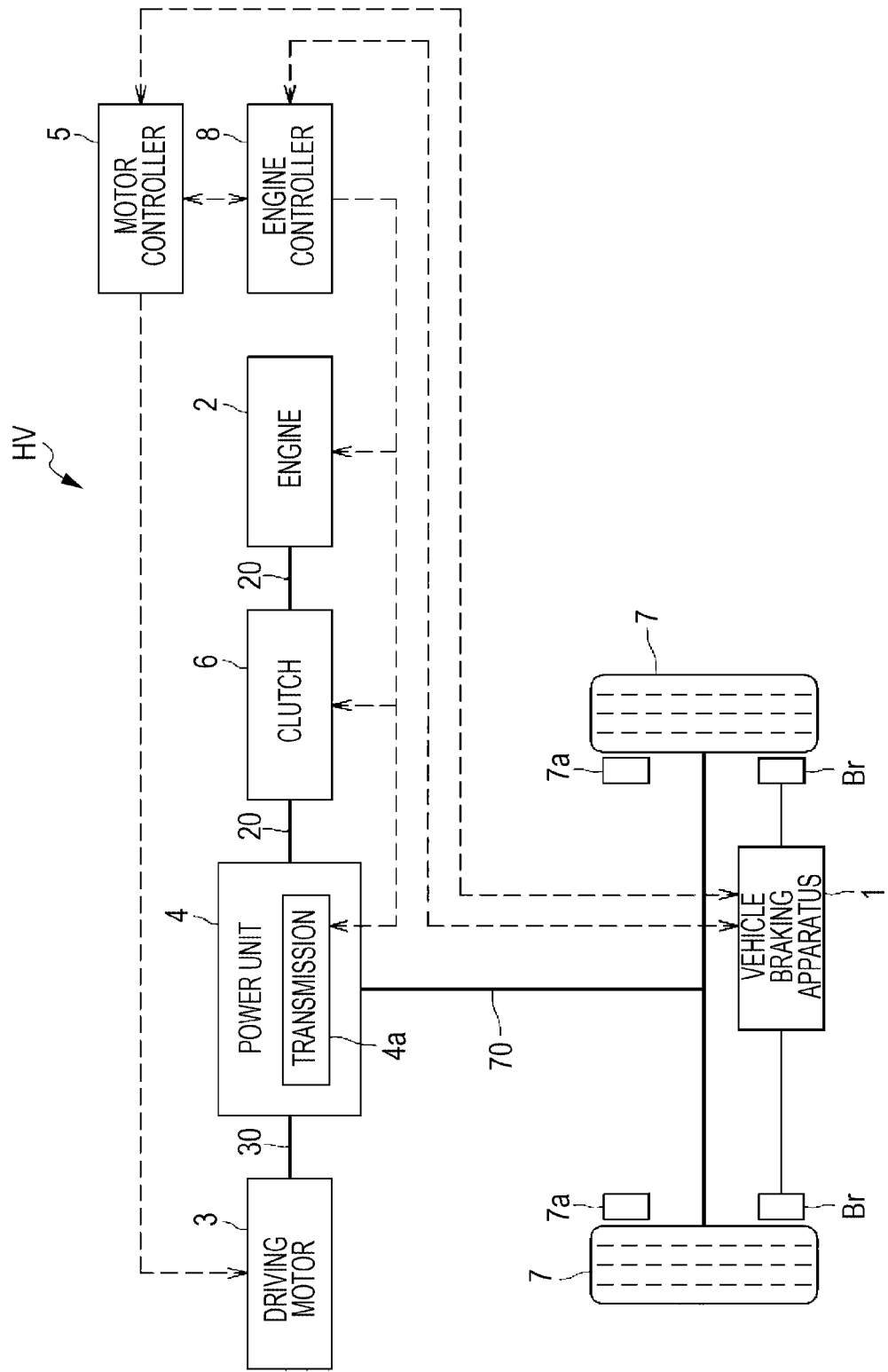
FIG. 1 is a diagram showing a configuration of a hybrid vehicle HV according to an embodiment.

An embodiment of the present invention provides a vehicle braking apparatus which is provided in a vehicle that is driven by a driving wheel that rotates with a power generated by an electric motor and has a reduction ratio setting unit that can change a reduction ratio between the electric motor and the driving wheel and which performs a brake assist control so as to boost a braking power on the basis of a target braking power that is set depending on an amount of operation of a brake operating member detected by an operating amount detection unit. The vehicle braking apparatus includes a first braking unit that causes the electric motor to generate a first braking power under regenerative control and a second braking unit that activates an actuating unit with an operating fluid to be pressurized through a hydraulic pressure source and thereby generates a second braking power, wherein, when an initiation condition for the brake assist control is met, the reduction ratio setting unit sets the reduction ratio so as to reduce the first braking power and then suspends a change to the reduction ratio, causing the first braking unit to generate the first braking power as well as causing the second braking unit to generate the second braking power and thereby producing the target braking power.

According to the embodiment, when the brake assist control is performed so as to boost a braking power, a change in the first braking power that varies depending on a change in the reduction ratio between the electric motor and the driving wheel can be suspended, thereby maintaining a state where the first braking power is reduced. In addition, the target braking power can be produced by adding the second braking power to the reduced first braking power.

Accordingly, a vehicle braking power can be finely controlled by making the second braking power finely controllable under the control of a hydraulic pressure acting on the actuating unit.

The first braking power is a braking power generated by the electric motor under the regenerative control. For this, the kinetic energy of a vehicle can be converted into electrical energy by causing the first braking power to be produced. If such electrical energy is configured to be storable, the vehicle kinetic energy can be recovered as electrical energy.

Another embodiment of the present invention provides a vehicle braking apparatus which is provided in a vehicle that is driven by a driving wheel that rotates with a power generated by an electric motor and has a reduction ratio setting unit that can change a reduction ratio between the electric motor and the driving wheel and which performs a brake assist control so as to boost a braking power on the basis of a target braking power that is set depending on an amount of operation of a brake operating member detected by an operating amount detection unit. The vehicle braking apparatus includes a first braking unit that causes the electric motor to generate a first braking power under regenerative control and a second braking unit that activates an actuating unit with an operating fluid to be pressurized through a hydraulic pressure source and thereby generates a second braking power, wherein, when an initiation condition for the brake assist control is met, the reduction ratio setting unit sets the reduction ratio so as to increase the first braking power, thereby causing the first braking unit to generate the first braking power.

According to the embodiment, the first braking power can be increased when the brake assist control is performed so as to boost a braking power.

Accordingly, the conversion of vehicle kinetic energy into electrical energy can be increased. If such electrical energy is configured to be storable, the vehicle kinetic energy can be optimally recovered as electrical energy.

Another embodiment of the present invention provides a vehicle braking apparatus which is provided in a vehicle that is driven by a driving wheel that rotates with at least one of a power generated by an electric motor and a power generated by an internal combustion engine, the vehicle having a reduction ratio setting unit that can change a reduction ratio between the electric motor and the driving wheel and a reduction ratio between the internal combustion engine and the driving wheel and having a clutch mechanism that engages and disengages the internal combustion engine and the reduction ratio setting unit, and which performs a brake assist control so as to boost a braking power on the basis of a target braking power that is set depending on an amount of operation of a brake operating member detected by an operating amount detection unit. The vehicle braking apparatus includes a first braking unit that causes the electric motor to generate a first braking power under regenerative control and a second braking unit that activates an actuating unit with an operating fluid to be pressurized through a hydraulic pressure source and thereby generates a second braking power, wherein, when an initiation condition for the brake assist control is met, the first braking unit generates the first braking power and the second braking unit generates the second braking power so as to produce the target braking power, and, in addition, the internal combustion engine and the reduction ratio setting unit are engaged with each other through the clutch mechanism.

According to the embodiment, when a brake assist control is performed so as to increase a braking power in a vehicle provided with an electric motor and an internal combustion engine, the internal combustion engine and the reduction ratio setting unit can be engaged with each other and consequently the internal combustion engine and the driving wheel can be engaged with each other.

Accordingly, when a brake assist control is performed, a braking power resulting from the retarding force in the internal combustion engine can be added to the first braking power and the second braking power, thereby braking the vehicle with a greater braking power.

Another embodiment of the present invention provides a vehicle braking apparatus described in the third aspect, wherein, if an initiation condition for the brake assist control is met, the internal combustion engine and the reduction ratio setting unit may remain engaged when the internal combustion engine is running.

According to the embodiment, the internal combustion engine and the driving wheel can be maintained in a state where they are engaged with each other, thereby allowing a braking power resulting from the retarding force in the internal combustion engine to be maintained. Accordingly, a state where a braking power resulting from the retarding force in the internal combustion engine is added to the first braking power and the second braking power so as to produce a greater braking power can be maintained.

Another embodiment of the present invention provides a vehicle braking apparatus described in any one of the first to fourth aspects, wherein a skidding detection unit for detecting that the vehicle skids is preferably provided and, if an initiation condition for the brake assist control is met, the reduction ratio setting unit sets the reduction ratio so as to reduce the first braking power when the skidding detection unit detects that the vehicle skids.

According to the embodiment, the first braking power can be reduced if the vehicle skids when the brake assist control is performed. The first braking power is a braking power to be generated by the driving wheel, and the braking power to be generated by the driving wheel can be reduced by reducing the first braking power. Accordingly, a driving wheel lock-up and skidding can be prevented.

The embodiments will now be described with reference to the accompanying drawings, wherein like reference numerals designate corresponding or identical elements throughout the various drawings.

As shown in FIG. 1, a vehicle braking apparatus 1 according to the embodiment is provided in a hybrid vehicle HV that runs by a combination of an engine 2, an internal combustion engine, and a driving motor 3, an electric motor. A driving force (engine power) generated by the engine 2 is input to a power unit 4 through an engine transfer shaft 20 provided with a clutch mechanism (clutch 6). A driving force (motor power) generated by the driving motor 3 is input to the power unit 4 through a motor transfer shaft 30.

The power unit 4 is structured to have a transmission 4a consisting of, for example, an automatic transmission, which transmits at least one of the engine power and the motor power to a drive shaft 70 connected to driving wheels 7, 7 through the transmission 4a during operation of the hybrid vehicle HV. This structure allows at least one of the engine power and the motor power to rotationally drive the driving wheels 7, 7. The driving wheels 7, 7 are configured to have wheel speed sensors 7a, 7a, respectively, so as to be able to detect the wheel speed (rotational speed) of the driving wheels 7, 7. In the case of a hybrid vehicle HV equipped with non-driving wheels (not illustrated) that are not connected to the engine 2 and the driving motor 3, preferably the non-driving wheels (not illustrated) are also configured to have the wheel speed sensors 7a so as to detect the wheel speed of the non-driving wheels.

The vehicle braking apparatus 1 has a function to actuate brake actuating units Br, Br provided on the driving wheels 7, 7 (front wheels for a front-wheel drive vehicle) that rotationally drive by at least one of the engine power and the motor power. If the brake actuating units Br are configured to be actuated by a fluid pressure of an operating fluid, the vehicle braking apparatus 1 actuates the brake actuating units Br by applying a fluid pressure of an operating fluid. Under this configuration, the brake actuating units Br are actuators operated through an operating fluid, which are described in the scope of claims. The operating fluid that acts on the brake actuating units Br is, for example, a hydraulic oil and the brake actuating units Br are hydraulically-actuated.

In the case of a hybrid vehicle HV equipped with non-driving wheels (not illustrated), preferably the non-driving wheels also have the brake actuating units BR therein and the vehicle braking apparatus 1 actuates the brake actuating units Br provided on the non-driving wheels.

A clutch 6 engages or disengages the engine transfer shaft 20 on the basis of a control signal received from an engine controller 8, thereby connecting or disconnecting between the engine 2 and the transmission 4a. When the engine transfer shaft 20 is engaged, the engine power generated by the engine 2 is transmitted to the driving wheels 7, 7 via the power unit 4 and the drive shaft 70. In contrast, when the engine transfer shaft 20 is disengaged, the transmission of the engine power from the engine 2 to the driving wheels 7, 7 is disconnected.

The engine 2 is controlled by the engine controller 8. The control of the engine 2 by the engine controller 8 is a known technology, whose in-depth description is accordingly omitted.

In the case of a hybrid vehicle HV provided with an automatic transmission, the engine controller 8 controls the transmission 4a in accordance with vehicle speed and engine output torque and the like.

The driving motor 3 is, for example, a brushless DC motor that is a generator motor and is controlled by a motor controller 5. The motor controller 5 is configured to be able to perform data communication with the engine controller 8, and the engine controller 8 and the motor controller 5 control the engine 2 and the driving motor 3 in a coordinated manner, thereby causing the hybrid vehicle HV to run.

A technology for causing the engine controller 8 and the motor controller 5 to work in a coordinated manner to move the hybrid vehicle HV is well known, whose in-depth description is accordingly omitted.

The motor controller 5, if necessary, switches the driving motor to a generator while the hybrid vehicle HV decelerates or slows down, thereby performing control (regenerative control) to convert kinetic energy into electrical energy. The regenerative control by the motor controller 5 causes the driving motor 3 to function as regenerative braking.

Electric power generated by the driving motor 3 functioning as a regenerative brake is configured to be stored in a battery (not illustrated).

The motor controller 5 includes an inverter for generating electric power to be supplied to the driving motor 3.

The engine controller 8 and the motor controller 5 includes a computer having a CPU (Central Processing Unit), a RAM (Random Access Memory), and a ROM (Read Only Memory) and its peripheral circuits, all of which are not illustrated. The engine controller 8 and the motor controller 5 may be configured in an integral manner.

Figure 2:
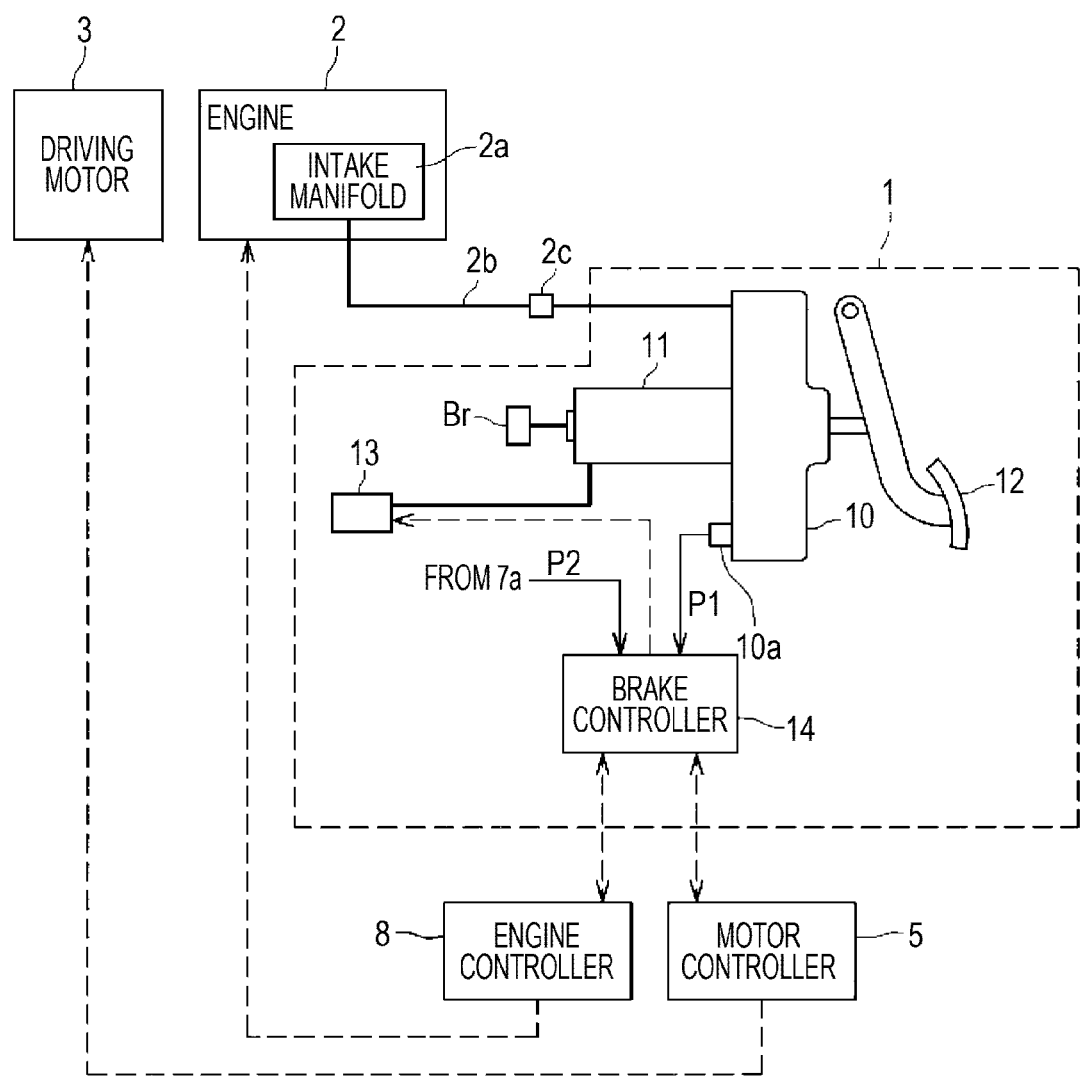
FIG. 2 shows a diagram showing a configuration of a vehicle braking apparatus.

The vehicle braking apparatus 1 according to this embodiment is configured as shown in, for example, FIG. 2, which is controlled by a brake controller 14.

The brake controller 14 includes a computer having a CPU, RAM, and ROM and its peripheral circuit, which are not illustrated. Also, the brake controller 14 is connected to the engine controller 8 and the motor controller 5 via CAN (Controller Area Network), thereby performing data communication thereamong. The engine controller 8, the motor controller 5, and the brake controller 14 may be configured in an integral manner.

The vehicle braking apparatus 1 includes the brake controller 14, the brake actuating unit Br, the brake operating member (a brake pedal 12), a brake booster 10 for converting into a hydraulic pressure a force (brake operating force) by which a vehicle operator depresses the brake pedal 12, and a wheel cylinder 11 that generates a hydraulic pressure according to the hydraulic pressure generated by the brake booster 10 and applies it to a hydraulic system of the brake actuating unit Br. Braking by the actuation of the brake actuating unit Br is hereinafter referred to as hydraulic braking, which is distinguished from the afore-mentioned regenerative braking. In other words, the hybrid vehicle HV (see FIG. 1) according to this embodiment has two braking systems, a hydraulic braking system and a regenerative braking system.

The brake booster 10 communicates with an intake manifold 2*a* constituting an intake system of the engine 2 with a pipe 2*b* therebetween. Negative pressure (hereinafter referred to as intake manifold negative pressure) generated in the intake manifold 2*a* is supplied to the brake booster 10 through a check valve 2*c*, causing the brake booster 10 to be maintained at negative pressure. With this arrangement, the brake booster 10 can boost brake operating force using the intake manifold negative pressure.

In addition, a booster pressure sensor 10*a* detects booster pressure and inputs the thus detected value to the brake controller 14 as a booster pressure signal P1.

The check valve 2*c* is a one-way valve. If the negative pressure as the booster pressure in the brake booster 10 is greater than the intake manifold negative pressure generated in the intake manifold 2*a*, the check valve 2*c* closes, thereby causing the booster pressure to be maintained at higher negative pressure. In contrast, if the negative pressure as the booster pressure is less than the intake manifold negative pressure, the check valve 2*c* opens, causing the intake manifold negative pressure to be supplied to the brake booster 10, which makes the negative pressure as the booster pressure equal to the intake manifold negative pressure.

The use of the check valve 2*c* functioning as described above allows the booster pressure to be maintained at higher negative pressure.

The negative pressure is lower than the atmospheric pressure and becomes greater with increasing level from the atmospheric pressure.

The wheel cylinder 11 is configured to be able to generate hydraulic pressure by the operation of a fluid pressure source (a hydraulic pressure source 13) which includes an actuator and the like. Inputting hydraulic pressure generated by the wheel cylinder 11 to a hydraulic system of the brake actuating unit Br allows the brake actuating unit Br to operate. The hydraulic pressure source 13 provided in the wheel cylinder 11 is controlled by the brake controller 14 and is configured to generate optimum hydraulic pressure and input it to the hydraulic system of the brake actuating unit Br.

As described above, the brake controller 14 according to this embodiment is a braking device that generates braking power by actuating the brake actuating unit Br with a hydraulic oil pressurized by the hydraulic pressure source 13.

The brake controller 14 receives a wheel speed, as a wheel speed signal P2, of the driving wheels 7, 7 and the non-driving wheels (not illustrated) detected by the wheel speed sensors 7*a*, 7*a* shown in FIG. 1. This arrangement allows the brake controller 14 to acquire the wheel speed of the driving wheels 7, 7 and the non-driving wheels. In addition, it can calculate a vehicle speed (vehicle body speed) of the hybrid vehicle HV on the basis of the wheel speed of the driving wheels 7, 7 and the non-driving wheels.

As described above, the engine controller 8 needs to calculate the vehicle speed to control the engine 2. For this, preferably the wheel speed signal P2 output by the wheel speed sensor 7*a* is also input to the engine controller 8.

The brake controller 14 is configured to be able to implement an antilock brake system (ABS) for controlling a hydraulic brake so as to prevent the driving wheels 7, 7 (see FIG. 1) and the non-driving wheels (not illustrated) from locking up and thereby avoid skidding during braking of the hybrid vehicle HV (see FIG. 1). The ABS of the brake controller 14 according to this embodiment can utilize a known technology and its detailed description is accordingly omitted.

With this arrangement, the brake controller 14 of the vehicle braking apparatus 1 calculates the braking power required to decelerate and stop the hybrid vehicle HV (see FIG. 1), depending on the amount of operation (amount of stroke) by which a vehicle operator depresses the brake pedal 12.

As shown in FIG. 2, the booster pressure sensor 10*a* is provided for detecting the booster pressure of the brake booster 10 in this embodiment, and the brake controller 14 calculates a braking power by treating a change in booster pressure as the amount of operation of the brake pedal 12.

Specifically, the brake controller 14 calculates a change in booster pressure on the basis of the booster pressure signal P1 received from the booster pressure sensor 10*a* and then calculates the braking power required to decelerate and stop the hybrid vehicle HV (see FIG. 1) on the basis of the thus calculated booster pressure change.

The thus calculated braking power is a target value (target braking power) which the brake controller 14 uses to perform control of the regenerative braking and hydraulic braking systems. The brake controller 14 is configured to calculate the amount of operation of the brake pedal 12 as a change in booster pressure, and the booster pressure sensor 10*a* for detecting the booster pressure is an operation amount detector described in the scope of claims.

A method by which the brake controller 14 calculates the braking power (target braking power) on the basis of a change in booster pressure of the brake pedal 12 is not limited to this. For example, with reference to a predetermined map showing a relationship between a change in booster pressure and a braking power, the brake controller 14 may calculate a target braking power on the basis of the calculated change in booster pressure.

Other methods by which the brake controller 14 calculates a target braking power may use a known technology.

Next, the brake controller 14 notifies the motor controller 5 and the engine controller 8 of the calculated target braking power. Upon receipt of the target braking power from the brake controller 14, the engine controller 8 controls the clutch 6 (see FIG. 1) so as to disengage the engine transfer shaft 20 (see FIG. 1). The motor controller 5 switches the driving motor 3 into a generator, thereby activating regenerative braking. A series of control steps in which the motor controller 5 switches the driving motor 3 into a generator and activates regenerative braking are referred to as a regenerative control.

A braking power generated by the driving motor 3 under the regenerative control is referred to as a regenerative braking power and is handled as a first braking power in this embodiment. The motor controller 5 that switches the driving motor 3 into a generator under the regenerative control and activates the regenerative braking is a first braking device described in the scope of claims.

The engine controller 8 (see FIG. 1) sets a reduction ratio (hereinafter referred to as just reduction ratio of the driving motor 3) between the driving motor 3 (see FIG. 1) and the driving wheels 7, 7 (see FIG. 1) in accordance with the vehicle speed.

The regenerative braking power generated by the driving motor 3 under the regenerative control changes depending on a change in rotational speed of a motor transfer shaft 30 (see FIG. 1). As shown in FIG. 1, since the motor transfer shaft 30 according to this embodiment is connected to the drive shaft 70 (driving wheels 7, 7) via the transmission 4a, the reduction ratio of the driving motor 3 can be altered by changing the gear ratio of the transmission 4a can alter. In addition, the ratio (rotational speed ratio) between the wheel speed of the driving wheels 7, 7 and the rotational speed of the motor transfer shaft 30 can be altered by changing the reduction ratio of the driving motor 3.

Accordingly, changing the reduction ratio of the driving motor 3 allows the driving motor 3 to generate the regenerative braking power according to the wheel speed of the driving wheels 7, 7.

For example, if the transmission 4a (see FIG. 1) has a gear ratio settable in three steps, a low gear, a middle gear, and a high gear, the driving motor 3 (see FIG. 1) can set a reduction ratio in three steps. As shown in a map (regenerative braking power distribution map MP1) of FIG. 3, the distribution of the regenerative braking power generated by the driving motor 3 according to a vehicle speed (vehicle body speed) varies for each gear ratio of the transmission 4a. The vehicle speed in this embodiment is a value calculated from the wheel speeds of the driving wheels 7, 7 (see FIG. 1) and the non-driving wheels (not illustrated). Since there is a correlation between the wheel speed of the driving wheels 7, 7 and the vehicle speed, the abscissa axis of the regenerative braking power distribution map MP1 is set as the vehicle speed. The low gear, middle gear, and high gear become higher in gear ratio in that order with the reduction ratio of the driving motor 3 decreasing accordingly.

Figure 3:
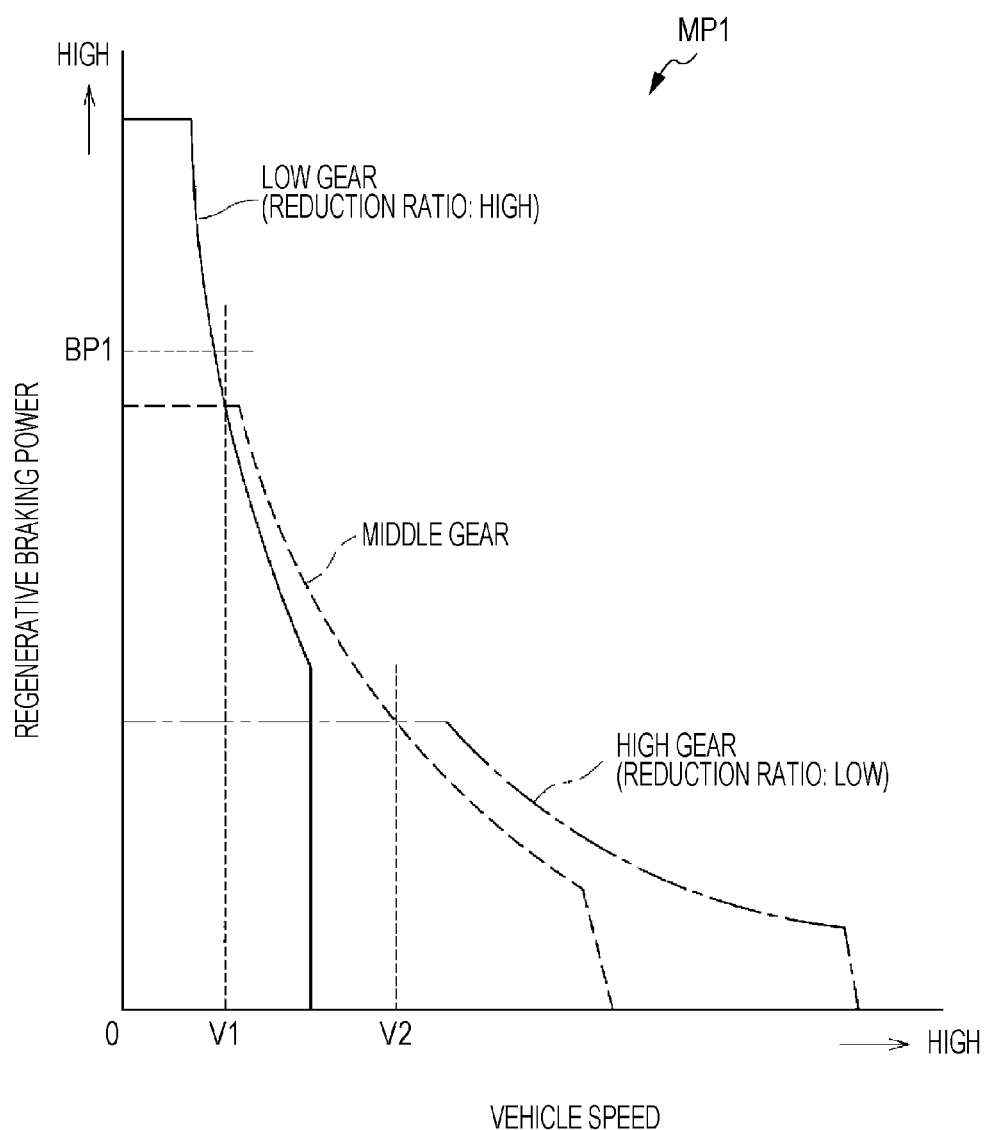
FIG. 3 is a diagram showing an example of a regenerative braking power distribution map.

The regenerative braking power distribution map MP1 shown in FIG. 3 indicates that a regenerative braking power according to a vehicle speed can be generated by the regenerative brake for each of the gear ratios (low gear, middle gear, and high gear) set in the transmission 4a (see FIG. 1), namely, for each of the reduction ratios of the driving motor 3. Accordingly, for example, the engine controller 8 (see FIG. 1) can change the gear ratio (reduction ratio of the driving motor 3) of the transmission 4a (see FIG. 1) depending on the vehicle speed and thereby alter the regenerative braking power to be generated by the regenerative brake.

For example, as shown in the regenerative braking power distribution map MP1, a threshold value (second vehicle speed threshold value V2) showing a region where a regenerative braking power for the middle gear is greater than a regenerative braking power for the high gear and a threshold value (first vehicle speed threshold value V1) showing a region where a regenerative braking power for the low gear is greater than a regenerative braking power for the middle gear are set. In this case, the second vehicle speed threshold value V2 is higher than the first vehicle speed threshold value V1 (V2>V1).

Next, the engine controller 8 (see FIG. 1) sets the transmission 4a (see FIG. 1) to the highest gear ratio or the high gear ratio and sets the driving motor 3 (see FIG. 1) to the lowest reduction ratio when the vehicle speed is higher than the second vehicle speed threshold value V2. Also, the engine controller 8 sets the transmission 4a (see FIG. 1) to the lowest gear ratio or the low gear ratio and sets the driving motor 3 (see FIG. 1) to the highest reduction ratio when the vehicle speed is lower than the second vehicle speed threshold value V1. Furthermore, the engine controller 8 sets the transmission 4a to the middle gear ratio between the high and low gear ratios when the vehicle speed is higher than the first vehicle speed threshold value V1 and lower than the second vehicle speed threshold value V2.

With this configuration, the engine controller 8 (see FIG. 1) can change the reduction ratio of the driving motor 3 (see FIG. 1) depending on the first vehicle speed threshold value V1 and the second vehicle speed threshold value V2, thereby allowing the driving motor 3 to generate the maximum regenerative braking power according to the vehicle speed when the driving motor 3 functions as a regenerative brake.

If a greater regenerative braking power is generated when the vehicle speed is less than a predetermined speed level lower than the first vehicle speed threshold value V1, the hybrid vehicle HV (see FIG. 1) suddenly comes to a stop, making the driver feel uncomfortable. To avoid this situation, the engine controller 8 (see FIG. 1) is configured to set, for example, the transmission 4a (see FIG. 1) to a neutral gear when the vehicle speed is less than a predetermined speed level. As a result, the transmission of the rotation from the driving wheels 7, 7 (see FIG. 1) to the driving motor 3 (see FIG. 1) is disconnected, causing regenerative braking to become deactivated. Such a predetermined speed level is set in advance on the basis of the braking capability requirement for the hybrid vehicle HV and operational feeling of the driver and the like, which is hereinafter referred to as a regenerative lower limit speed Vlmt (see FIG. 4A).

As described above, in this embodiment the engine controller 8 and the transmission 4a (see FIG. 1) can set or change the reduction ratio of the driving motor 3, and the engine controller 8 and the transmission 4a are reduction ratio setting devices described in the scope of claims.

Upon receipt of a target braking power from the brake controller 14 (see FIG. 2), the engine controller 8 (see FIG. 1) makes reference to the regenerative braking power distribution map MP1, depending on the vehicle speed, and makes a determination of, for example, a gear ratio which produces the greatest regenerative braking power as long as it falls below the target braking power. Then, the engine controller 8 sets the transmission 4a (see FIG. 1) to the thus determined gear ratio.

For example, if the brake controller 14 (see FIG. 2) determines the target braking power as BP1 shown in FIG. 3 on the basis of the amount of operation of the brake pedal 12 (see FIG. 2), the engine controller 8 (see FIG. 1) sets the transmission 4a to the high gear ratio when the vehicle speed is higher than the second vehicle speed threshold value V2 and thereby activates regenerative braking, and sets (or changes) the transmission 4a to the middle gear ratio when the vehicle speed goes down to the second vehicle speed threshold value V2. In addition, the engine controller 8 sets (or changes) the transmission 4a to the low gear ratio when the vehicle speed further goes down to the first vehicle speed threshold value V1.

Furthermore, the controller 8 (see FIG. 1) sets (or changes) the transmission 4a (see FIG. 1) to the neutral gear ratio when the vehicle speed decreases to the regenerative lower limit speed Vlmt. Also, in order to attain the calculated target braking power BP1 with the hydraulic brake, the brake controller 14 (see FIG. 2) calculates a hydraulic pressure to be input to the brake actuating unit Br (see FIG. 2) and controls the hydraulic pressure source 13 (see FIG. 2) so as to ensure that the thus calculated hydraulic pressure is generated by the wheel cylinder 11 (see FIG. 2) and is input to the brake actuating unit Br. When the hydraulic brake is activated so as to generate braking power, the hybrid vehicle HV (see FIG. 1) decelerates and finally comes to a stop.

The braking power generated by the hydraulic brake is a second braking power in comparison with the regenerative braking power (first braking power). The brake actuating unit Br (see FIG. 2) is generally configured to generate braking power by converting the kinetic energy of the hybrid vehicle HV (see FIG. 1) into friction heat. For this, the second braking power generated by the actuation of the hydraulic brake is hereinafter referred to as a friction braking power. The brake controller 14 (see FIG. 2) that is a braking unit for generating the friction braking power (second braking power) is a second controlling unit.

Figure 4A:
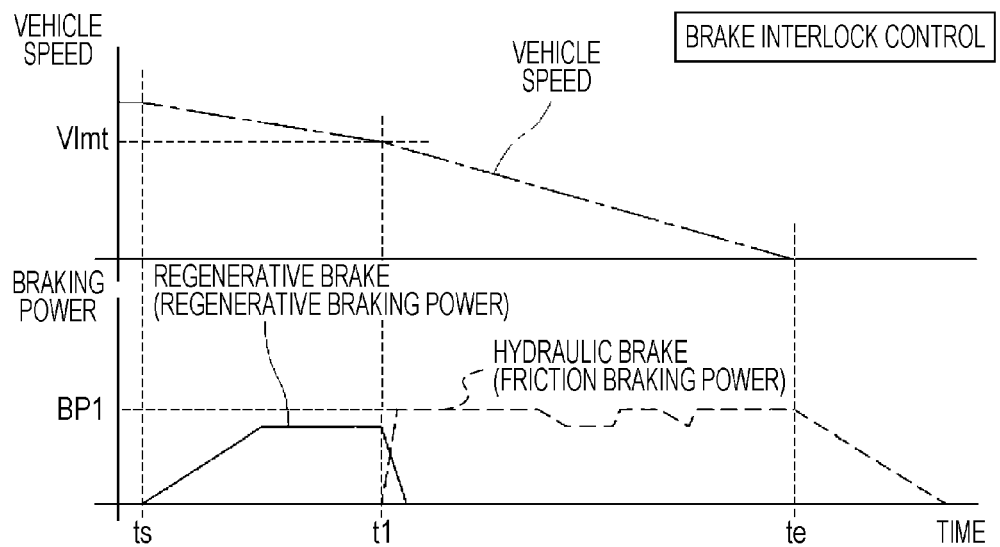
FIG. 4A is a diagram showing a change in braking power and vehicle speed in a brake interlock control.

As shown in, for example, FIG. 4A, if the driver depresses the brake pedal 12 (see FIG. 2) at time ts, first the regenerative brake becomes activated on the basis of the target braking power BP1 calculated depending on a change in booster pressure. As a result the vehicle speed decreases and further goes down to the regenerative lower limit speed Vlmt at which the hydraulic brake becomes activated at time t1. At this time, a hydraulic pressure generated by the wheel cylinder 11 (see FIG. 2) is set in such a manner that the friction braking power generated by the hydraulic brake becomes equal to the target braking power BP1. Then, at time to the hybrid vehicle (see FIG. 1) comes to a stop at vehicle speed of 0 km/h.

As described above, the braking power through a hydraulic pressure generated by the brake booster 10 (see FIG. 2) depending on the depressing operation of the brake pedal 12 by the driver is boosted by the regenerative braking power and the hydraulic braking power under a brake assist control.

A fluctuation in friction braking power of the hydraulic brake in FIG. 4A indicates the control of the friction braking power by the ABS function. Accordingly, this fluctuation does not occur in a situation where no ABS function is activated.

As described above, when the vehicle speed is higher than the regenerative lower limit speed Vlmt, the regenerative brake is used to generate regenerative braking power, while, when the vehicle speed falls below the regenerative lower limit speed Vlmt, the hydraulic brake is used to generate friction braking power and thereby assist the braking power. Such a brake assist control allows the kinetic energy of the hybrid vehicle HV (see FIG. 1) running at a high speed to be recovered by the regenerative brake as electrical energy. When the vehicle speed decelerates to less than the regenerative lower limit speed Vlmt, the hydraulic brake causes the hybrid vehicle to come to a stop. The brake assist control in which the regenerative brake and the hydraulic brake are interlocked is hereinafter referred to as a brake interlock control.

However, the brake interlock control described above controls an oil pressure input to the brake actuating unit Br (see FIG. 2) when the regenerative brake is working, namely, during a period between time is and t1 of FIG. 4A, but cannot control a braking power generated in the hybrid vehicle HV (see FIG. 1), which does not make the ABS effectively operative.

For example, when the driver makes a request for emergency braking by strongly depressing the brake pedal 12 (see FIG. 2) in a situation where a tire lock-up and resultant skidding are highly likely to occur, the hybrid vehicle HV has a likelihood of becoming unstable depending on the state of a road surface if the ABS does not work effectively.

Accordingly, the brake controller 14 (see FIG. 2) is traditionally configured to boost the braking power under the brake assist control different from the brake interlock control when the driver makes a request for emergency braking by strongly depressing the brake pedal 12 (see FIG. 2). In this case, the brake controller 14 as an emergency braking determination unit determines that the driver makes a request for emergency braking, namely, emergency braking.

Next, the brake controller 14, when determining the emergency braking, causes the wheel cylinder 11 (FIG. 2) to generate a hydraulic pressure which is input to the brake actuating unit Br (see FIG. 2) so as to activate the hydraulic brake, even if the vehicle speed does not go down to the regenerative lower limit speed Vlmt.

Also, the brake controller 14 (see FIG. 2) sets the transmission 4a (see FIG. 1) to the neutral gear through the engine controller 8 (see FIG. 1). Specifically, the brake controller 14 notifies the engine controller 8 of the fact that the emergency braking is determined. In response to this notification, the engine controller 8 sets the transmission 4a to the neutral gear. As a result, the rotational drive of the drive wheels 7, 7 (see FIG. 1) is not transmitted to the driving motor 3 (see FIG. 1), deactivating the regenerative brake.

When the driver makes a request for emergency braking, the brake pedal 12 (see FIG. 2) is often depressed to its limit, which causes a stroke of the brake pedal 12 to become maximum. Accordingly, the brake controller 14 (see FIG. 2), when determining the emergency braking, causes the hydraulic brake to generate a friction braking power of a target braking power BP2 corresponding to the maximum stroke.

The target braking power BP2 associated with the maximum stroke resulting from the brake pedal 12 depressed to its limit is hereinafter referred to as maximum target braking power. This maximum target braking power BP2 is a value predetermined as a design value of the hybrid vehicle HV (see FIG. 1).

Figure 4B:
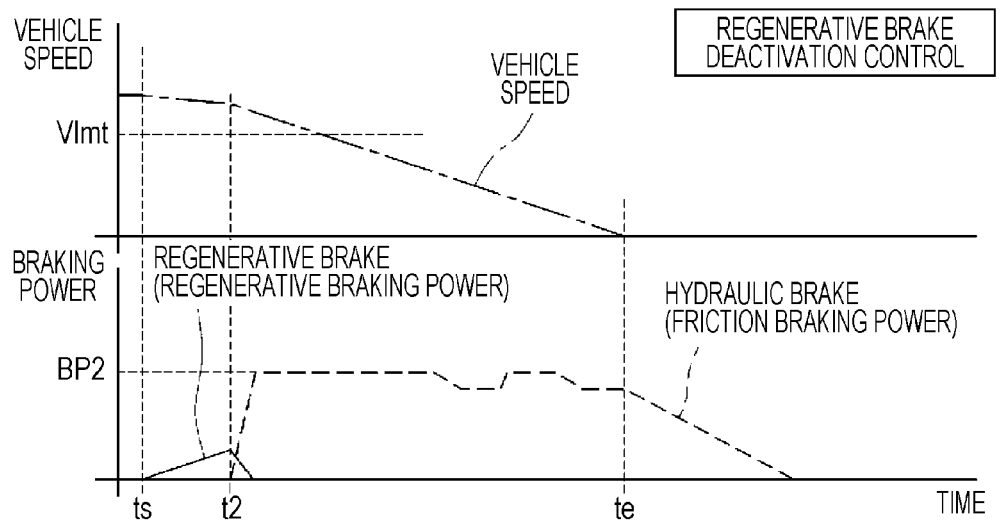
FIG. 4B is a diagram showing a change in braking power and vehicle speed in a regenerative brake deactivation control.

As shown in, for example, FIG. 4B, when the brake controller 14 (see FIG. 2) makes a determination of the emergency braking at time t2, it causes the hydraulic brake to be activated even if the vehicle speed does not decelerate to the regenerative lower limit speed Vlmt. At this time, a hydraulic pressure generated by the wheel cylinder 11 (see FIG. 2) is configured in such a manner that the friction braking power to be generated by the hydraulic brake becomes equal to the maximum target braking power BP2.

In addition, the transmission 4a (see FIG. 1) is set to the neutral gear via the engine controller 8 (see FIG. 1). As a result, as compared to the brake interlock control shown in FIG. 4A, a time of period (from time is to time te) between the initiation of braking operation by the driver and the cessation of the hybrid vehicle HV can be shortened, which consequently results in a shortened braking distance.

Since only the hydraulic brake is activated after time t2, a braking power generated in the hybrid vehicle HV (see FIG. 1) can be finely controlled by controlling the hydraulic pressure input to the brake actuating unit Br (see FIG. 2). In other words, the ABS function can be effectively performed. Accordingly, the hybrid vehicle HV can be kept stable while being braked urgently. As described above, a brake assist control in which the regenerative brake is deactivated and the hydraulic brake is activated to boost the braking power is hereinafter referred to as regenerative brake deactivation control.

A method by which the brake controller 14 (see FIG. 2) makes a determination of the emergency braking is not limited to above. For example, the brake controller 14 makes a determination of the emergency braking if a change in booster pressure in a unit of time, namely, a booster pressure rate of change is greater than a predetermined level. The predetermined level for the booster pressure rate of change which the brake controller 14 uses to make a determination of the emergency braking is hereinafter referred to as emergency braking determination threshold value. This emergency braking determination threshold value is appropriately set as a characteristic value based on the configuration of the brake booster 10 (see FIG. 2) and the performance requirement for the hybrid vehicle HV (see FIG. 1).

As described above, when the driver depresses the brake pedal 12 (see FIG. 2), the hybrid vehicle HV (see FIG. 1) provided with the engine 2 (see FIG. 1) and the driving motor 3 (see FIG. 1) causes the brake controller 14 (see FIG. 2), the motor controller 5 (see FIG. 2), and the engine controller 8 (see FIG. 2) to cooperatively activate the regenerative brake and the hydraulic brake, thereby allowing the hybrid vehicle HV to slow down and come to a stop.

However, as shown in FIG. 1, the hybrid vehicle according to this embodiment includes the transmission 4a provided between the driving motor 3 and the driving wheels 7, 7 and thereby varies a regenerative braking power by changing the reduction ratio of the driving motor 3.

For this, the hybrid vehicle HV according to this embodiment can be configured to vary the regenerative braking power, depending on, for example, the vehicle speed during emergency braking.

For example, the regenerative brake deactivation control shown in FIG. 4B deactivates the regenerative brake when the brake controller 14 (see FIG. 2) makes a determination of the emergency braking. However, as shown in FIG. 5A, the regenerative brake is caused to generate a small regenerative braking power and at the same time the hydraulic brake is caused to generate a friction braking power, both of which are combined and used to boost the braking power, thereby performing a brake assist control.

Figure 5A:
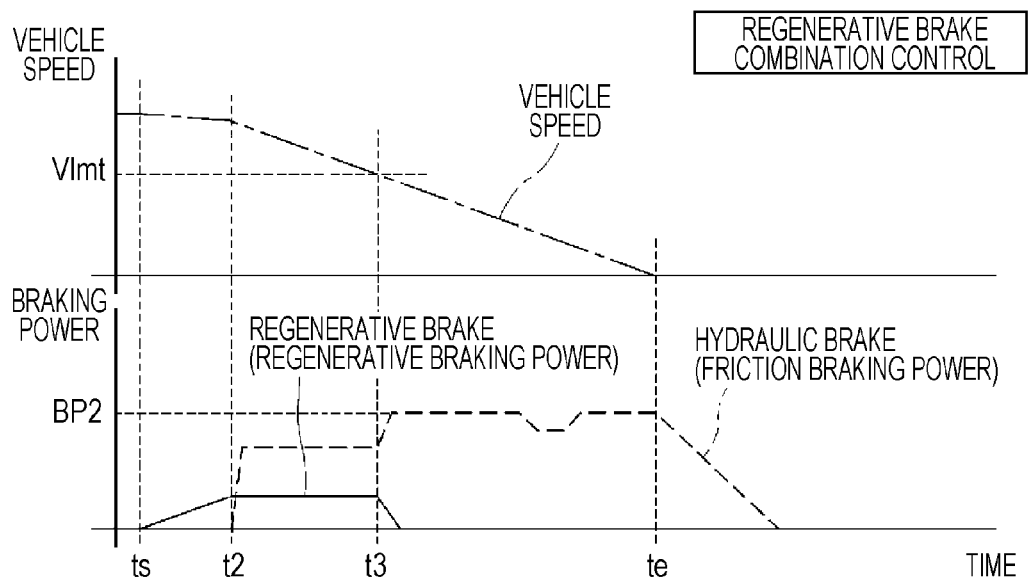
FIG. 5A is a diagram showing a change in braking power and vehicle speed in a regenerative brake combination control.

Specifically, as shown in FIG. 5A, the brake controller 14 (see FIG. 2), when determining the emergency braking at time t2, notifies the engine controller 8 (see FIG. 1) of the determination of the emergency braking. In response to this notification, the engine controller 8 sets the driving motor 3 (see FIG. 1) to the lower reduction ratio (for example, sets the transmission 4a to the high gear ratio) and suspends the change to reduction ratio at that state, thereby generating a small regenerative braking power.

Also, the brake controller 14 notifies the motor controller 5 (see FIG. 1) of the determination of the emergency braking. In response to this notification, the motor controller 5 switches the driving motor 3 (see FIG. 1) to the generator under the regenerative control.

The driving motor 3 (see FIG. 1) functions as a regenerative brake and generates a regenerative braking power depending on the vehicle speed.

Furthermore, the brake controller 14 (see FIG. 2) causes the wheel cylinder 11 (see FIG. 2) to generate a hydraulic pressure which is input to the brake actuating unit Br (see FIG. 2) so as to activate the hydraulic brake. Then, the brake controller 14 causes the hydraulic brake to generate a friction braking power corresponding to a shortfall in the maximum target braking power BP2 and adds the friction braking power to the regenerative braking power.

As shown in FIG. 5A, when the vehicle speed the hybrid vehicle HV (see FIG. 1) goes down to the regenerative lower limit speed Vlmt at time t3, the engine controller 8 (see FIG. 1) sets the transmission 4a (see FIG. 1) to the neutral gear and thereby deactivates the regenerative brake. In addition, the brake controller 14 (see FIG. 2) increases the hydraulic pressure generated in the wheel cylinder 11 (see FIG. 2) and inputs it to the brake actuating unit Br (see FIG. 2), thereby causing the hydraulic brake to generate the maximum target braking power BP2. The hybrid vehicle HV decelerates using the hydraulic brake and comes to a stop at time te.

As described above, a brake assist control for boosting a braking power using a hydraulic braking power generated by the hydraulic brake in addition to a small regenerative braking power by the regenerative brake is hereinafter referred to as regenerative brake combination control.

For example, if the brake controller 14 (see FIG. 2) is configured to perform a regenerative brake combination control in response to a driver's request for emergency braking, such a regenerative brake combination control makes it an initiation condition that the brake controller 14 makes a determination of emergency braking. When the initiation condition is met, the engine controller 8 (see FIG. 1) sets the reduction ratio of the driving motor 3 (see FIG. 1) so as to reduce a regenerative braking power and then suspends a change to the reduction ratio, thereby performing a brake assist control for generating the maximum target braking power BP2 using the regenerative braking power and the friction braking power.

At this time, the engine controller 8 (see FIG. 1) sets the driving motor 3 (see FIG. 1) to the lower reduction ratio so as to reduce the regenerative braking power and then suspends a change to the reduction ratio of the transmission 4a (see FIG. 1). In this case, the engine controller 8 sets the driving motor 3 to the lower reduction ratio by setting the transmission 4a to the high gear ratio.

The regenerative brake combination control can use the hydraulic brake concurrently with the regenerative brake until the vehicle speed falls below the regenerative lower limit speed Vlmt. Accordingly, for example, when the driver makes a request for emergency braking, the regenerative brake combination control causes the ABS function to work effectively by controlling a hydraulic pressure input to the brake actuating unit Br (see FIG. 1) even in a situation where a tire lock-up and resultant skidding are likely to occur, thereby allowing the hybrid vehicle HV (see FIG. 1) to be kept stable during braking.

In addition, the kinetic energy of the hybrid vehicle HV can be recovered as electrical energy until the vehicle speed goes down below the regenerative lower limit speed Vlmt. Accordingly, the energy efficiency of the hybrid vehicle HV can be improved as compared to the case where no regenerative braking power is generated.

If the engine controller 8 (see FIG. 1) controls the clutch 6 (see FIG. 1) so as to engage the engine transfer shaft 20 (see FIG. 1) while the regenerative brake is generating a regenerative braking power under the regenerative brake combination control, engine braking becomes effective, thereby allowing a braking power to be generated through the engine braking. A braking power through the engine brake is hereinafter referred to as engine braking power.

Figure 5B:
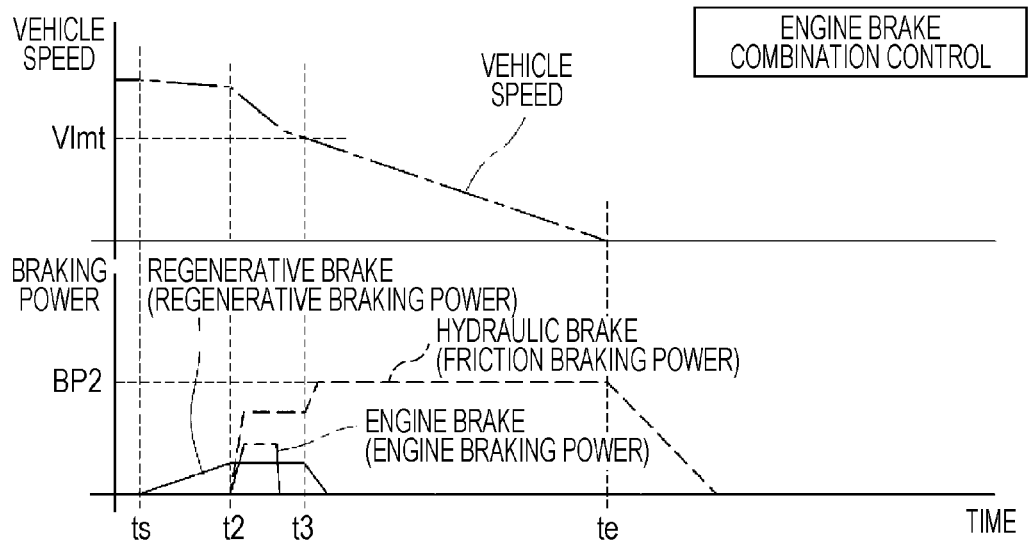
FIG. 5B is a diagram showing a change in braking power and vehicle speed in an engine brake combination control.

As shown in, for example, FIG. 5B, if the brake controller 14 (see FIG. 2) performs the regenerative brake combination control when determining emergency braking at time t2, the brake controller 14 notifies the engine controller 8 (see FIG. 1) of the determination of the emergency braking. In response to this notification, the engine controller 8 controls the clutch 6 (see FIG. 1) so as to engage the engine transfer shaft 20 (see FIG. 1).

An engine braking power resulting from the engine brake is generated in the hybrid vehicle HV (see FIG. 1) and is added to the regenerative braking power and the hydraulic braking power to create a greater braking power, thereby shortening a period of time till the vehicle speed decelerates below the regenerative lower limit speed Vlmt.

As described above, a brake assist control for boosting a braking power by concurrently using the engine brake under the regenerative brake combination control is referred to as engine brake combination control.

For example, if the brake controller 14 (see FIG. 2) is configured to perform an engine brake combination control in response to a driver's request for emergency braking, such a engine brake combination control makes it an initiation condition that the brake controller 14 makes a determination of emergency braking. When the initiation condition is met, the clutch 6 (see FIG. 1) engages the engine transfer shaft 20 (see FIG. 1), namely, the engine 2 and the transmission 4a are connected to each other, thereby performing a brake assist control for generating the maximum target braking power BP2 using the regenerative braking power and the friction braking power.

Under the engine brake combination control, an engine braking power is added to the maximum target braking power BP2 to be generated using the regenerative braking power and the friction braking power, thereby reducing a period of time till the vehicle speed decelerates below the regenerative lower limit speed Vlmt, which results in a reduced period of time (time is through te) between the depression of the brake pedal 12 (see FIG. 2) by the driver and the cessation of the hybrid vehicle HV (see FIG. 1) as well as a reduced stopping distance.

When performing the engine brake combination control, the brake controller 14 (see FIG. 2) may be configured to disengage the engine transfer shaft 20 (see FIG. 1) with the clutch 6 (see FIG. 1) when, for example, the hybrid vehicle HV (see FIG. 1) decelerates to a predetermined speed. In this case, a predetermined speed at which the engine transfer shaft 20 is disengaged may be appropriately configured on the basis of driver's operational feeling or the like.

Alternatively, the engine brake combination control may be configured in such a manner that the engine 2 is not disconnected from the transmission 4a. This configuration can prolong a period of time during which an engine braking power is generated, thereby effectively decelerating the hybrid vehicle HV.

Although the regenerative brake combination control described above causes the regenerative brake to generate a regenerative braking power by lowering the reduction ratio of the driving motor 3 (see FIG. 1), the regenerative braking power distribution map MP1 shown in FIG. 3 indicates that setting the driving motor 3 to the higher reduction ratio at a lower vehicle speed produces a greater braking power.

Accordingly, a brake assist control is conceivable where, under the regenerative brake combination control, the engine controller 8 (see FIG. 1) sets the driving motor 3 (see FIG. 1) to the higher reduction ratio at a lower vehicle speed so as to increase a regenerative braking power of the regenerative brake and thereby boost the braking power.

Figure 6:
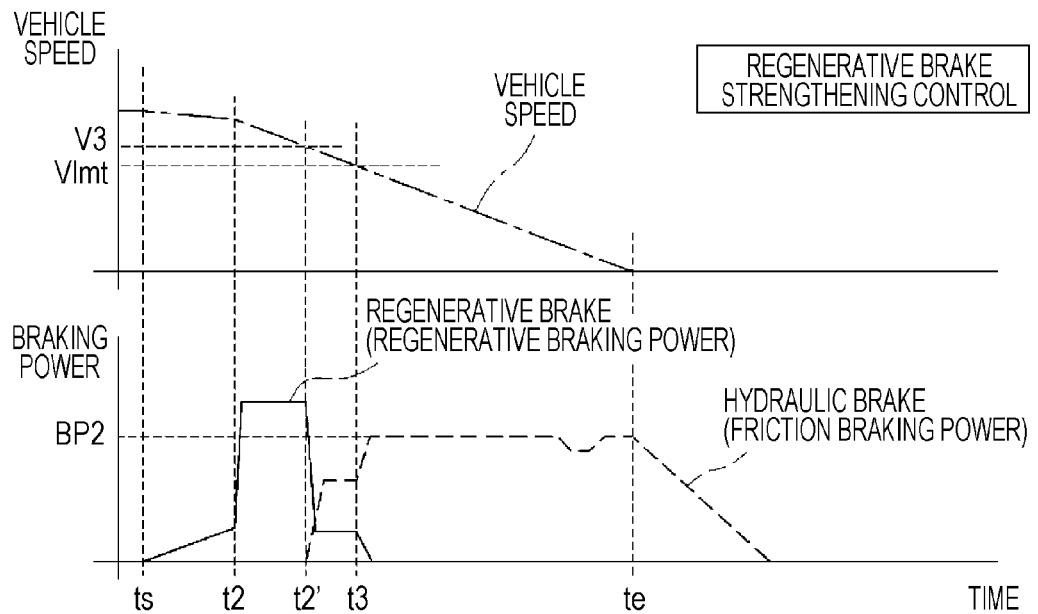
FIG. 6 is a diagram showing a change in braking power and vehicle speed in a regenerative brake strengthening control.

As shown in, for example, FIG. 6, if the brake controller 14 (see FIG. 2) performs the regenerative brake combination control when determining emergency braking at time t2, the brake controller 14 notifies the engine controller 8 (see FIG. 1) of the determination of the emergency braking. In response to this notification, the engine controller 8 sets the transmission 4a (see FIG. 1) to the lower gear ratio and sets the driving motor 3 (see FIG. 1) to the higher reduction ratio. For example, the engine controller 8 sets the transmission 4a (see FIG. 1) to the middle gear ratio when the vehicle speed is not greater than the first vehicle speed threshold value V2 and also sets the transmission 4a (see FIG. 1) to the low gear ratio when the vehicle speed is not greater than the first vehicle speed threshold value V1. Since these settings can increase a regenerative braking power of the regenerative brake, setting, by the engine controller 8, the driving motor 3 to the higher reduction ratio means setting the reduction ratio so as to increase the regenerative braking power.

When the vehicle speed decelerates to a predetermined speed V3 at time t2', the engine controller 8 (see FIG. 1) sets the driving motor 3 to the lower reduction ratio (for example, sets the transmission 4a to the high gear ratio), thereby reducing the regenerative braking power and avoiding overbraking by the regenerative brake. In addition, the brake controller 14 (see FIG. 2) causes the wheel cylinder 11 (see FIG. 2) to generate a hydraulic pressure which is input to the brake actuating unit Br (see FIG. 2) so as to activate the hydraulic brake, thereby causing the hydraulic brake to generate a friction braking power corresponding to a shortfall in the maximum target braking power BP2 and adding the friction braking power to the regenerative braking power.

Subsequently, when the vehicle speed of the hybrid vehicle HV (see FIG. 1) falls below the regenerative lower limit speed Vlmt, the engine controller 8 (see FIG. 1) sets the transmission 4a (see FIG. 1) to the neutral gear and thereby deactivates the regenerative brake. In addition, the brake controller 14 (see FIG. 2) causes the wheel cylinder 11 (see FIG. 2) to generate more hydraulic pressure which is input to the brake actuating unit Br (see FIG. 2), thereby causing the hydraulic brake to generate a friction braking power corresponding to the maximum target braking power BP2. As a result, the hybrid vehicle HV decelerates using the hydraulic brake and comes to a stop at time te.

As described above, a brake assist control for generating a greater braking power to boost a braking power under the regenerative brake combination control is hereinafter referred to as regenerative brake strengthening control.

For example, if the brake controller 14 (see FIG. 2) is configured to perform a regenerative brake strengthening control in response to a driver's request for emergency braking, such a regenerative brake strengthening control makes it an initiation condition that the brake controller 14 makes a determination of emergency braking. When the initiation condition is met, the engine controller 8 (see FIG. 1) sets the reduction ratio so as to increase a regenerative braking power, thereby performing a brake assist control for generating the maximum target braking power BP2 using the regenerative braking power and the friction braking power.

A predetermined speed V3 at which the engine controller 8 (see FIG. 1) sets the driving motor 3 to the lower reduction ratio, namely, a speed V3 at time t2' of FIG. 6 may be appropriately set on the basis of, for example, the braking requirement for the hybrid vehicle HV (see FIG. 1) and driver's operational feeling and the like.

The regenerative brake strengthening control can efficiently recover the kinetic energy of the hybrid vehicle HV (see FIG. 1) as electrical energy until the vehicle speed goes down below a predetermined speed V3 at time t2'. Also, like the engine brake combination control, it can reduce a period of time during which the vehicle speed decelerates below the regenerative lower limit speed Vlmt, thereby shortening a period of time (from time is to time te) between the depression of the brake pedal 12 (see FIG. 2) by the driver and the cessation of the hybrid vehicle HV and consequently leading to a shortened stopping distance.

As described above, the hybrid vehicle HV (see FIG. 1) according to this embodiment can change the reduction ratio of the driving motor 3 (see FIG. 1) by altering the gear ratio of the transmission 4a (see FIG. 1), thereby changing the degree of a regenerative braking power generated by the driving motor 3 that functions as a regenerative brake.

In addition, the brake controller 14 (see FIG. 2), the engine controller 8 (see FIG. 1), and the motor controller 5 (see FIG. 1) can be configured to cooperatively perform one of the brake assist controls including the brake interlock control, the regenerative brake deactivation control, the regenerative brake combination control, the engine brake combination control, and the regenerative brake strengthening control through the combined use of the hydraulic brake, the regenerative brake, and the engine brake and, thereby braking the hybrid vehicle HV.

For example, in response to a driver's request for emergency braking, the brake controller 14 (see FIG. 2) can configure a vehicle braking apparatus 1 (see FIG. 1) in which a brake assist control is selectable on the basis of the characteristics of the regenerative brake deactivation control, the regenerative brake combination control, the engine brake combination control, and the regenerative brake strengthening control and surrounding situations. The surrounding situations include, for example, a road surface condition (road surface friction coefficient $\mu$).

As shown in FIG. 4B, only the hydraulic brake works under the regenerative brake deactivation control, causing a high hydraulic pressure to be input to the brake actuating unit Br.

Accordingly, it expands a range of a pressure that the brake controller 14 (see FIG. 2) can control through the ABS function. In other words, it expands a range of a braking power that the brake controller 14 can control through the ABS function, thereby allowing the hybrid vehicle HV (see FIG. 1) to be kept stable even in a situation where the hybrid vehicle HV is likely to be significantly destabilized.

This allows the hybrid vehicle HV to be urgently braked in a stable manner even on, for example, a road surface on which a tire lock-up and resultant skidding are likely to occur. Accordingly, it is preferable that the regenerative brake deactivation control is used to urgently brake the hybrid vehicle HV in a stable manner during an emergency braking on a low-$\mu$ road surface with a very low friction coefficient $\mu$ such as an icy road surface.

As shown in FIG. 5A, the regenerative brake combination control uses a combination of the regenerative brake and the hydraulic brake until the vehicle speed falls below the regenerative lower limit speed Vlmt. Accordingly, the hybrid vehicle HV (see FIG. 1) can be kept stable with the ABS function even in a situation where a tire lock-up and resultant skidding are likely to occur. However, a hydraulic pressure input to the brake actuating unit Br (see FIG. 1) is low as compared to that in the regenerative brake deactivation control, resulting in a reduced range of a hydraulic pressure controllable through the ABS function, namely, a reduced range of a controllable braking power. From this, during an emergency braking on a low-$\mu$ road surface (such as a wet pavement surface), having a road surface friction coefficient $\mu$ greater than an icy road surface, where the hybrid vehicle HV (see FIG. 1) is unlikely to become significantly unstable, the regenerative brake combination control may be preferably performed to recover kinetic energy as electrical energy. At this time if the hybrid vehicle HV becomes slightly unstable, preferably the hybrid vehicle HV is urgently braked with the ABS function in a stable manner.

As shown in FIG. 5B, the engine brake combination control uses an engine braking power by the engine brake and thereby shortens a period of time between the depression of the brake pedal 12 (see FIG. 2) by the driver and the cessation of the hybrid vehicle HV (see FIG. 1) and consequently reduces a stopping distance. Accordingly, for example, when the driver makes a highly urgent request for emergency braking, braking distance is preferably reduced by the engine brake combination control.

The regenerative brake strengthening control can increase the conversion of kinetic energy of the hybrid vehicle HV (see FIG. 1) into electrical energy as well as shorten a braking distance. However, only the regenerative brake works during a period of time between time t2 and t2' of, for example, FIG. 6 and thus the braking power cannot be controlled by the ABS function of the brake controller 14 (see FIG. 2). In other words, if a tire lock-up and skidding occur during this period of time, the hybrid vehicle HV cannot be kept stable. Accordingly, on a normal road surface (such as a dry pavement road surface), having a large road surface friction coefficient $\mu$, where the hybrid vehicle HV is unlikely to become unstable, the regenerative strengthening control is preferably used to reduce the braking distance while more kinetic energy is converted into electrical energy for recovery.

As described above, when the driver makes a request for emergency braking of the hybrid vehicle HV (see FIG. 1), the brake controller 14 (see FIG. 2) preferably selects from among brake assist controls, depending on the degree of urgency and the road surface friction coefficient $\mu$.

Accordingly, when the driver makes a request for emergency braking of the hybrid vehicle HV (see FIG. 1), the brake controller 14 (see FIG. 2) according to this embodiment is configured to predict the degree of urgency and the road surface friction coefficient $\mu$ as well as select a brake assist control, depending on the thus predicted degree of urgency and the road surface friction coefficient $\mu$.

The brake controller 14 (see FIG. 2) makes a determination of urgent emergency braking if, for example, a change rate of booster pressure is greater than a predetermined level.

A predetermined level which the brake controller 14 uses to determine the degree of urgency associated with emergency braking is preferably higher than the emergency braking determination threshold value described above (change rate of booster pressure) and is hereinafter referred to as urgency degree determination value. The urgency degree determination value is appropriately set on the basis of the performance requirement for the hybrid vehicle HV (see FIG. 1).

A method by which the brake controller 14 (see FIG. 2) predicts the road surface friction coefficient $\mu$ is not limited. For example, a known method of predicting the road surface friction coefficient $\mu$ predicts the road surface friction coefficient μ from a rate of skidding calculated on the basis of the rotational difference between the driving wheels 7, 7 (see FIG. 1) and the non-driving wheels (not illustrated).

As described above, the brake controller 14 according to this embodiment can acquire the rotational difference between the driving wheels 7, 7 and the non-driving wheels and thereby predict the road surface friction coefficient μ on the basis of the rate of skidding.

For example, a map is set in advance using experimental measurements, which shows a relationship between the rate of skidding, calculated on the basis of the rotational difference between the driving wheels 7, 7 (see FIG. 1) and the non-driving wheels (not illustrated), and the road surface friction coefficient μ. Then, the brake controller 14 (see FIG. 2) can be configured to reference such a map on the basis of the rate of skidding to be calculated from the wheel speed of the driving wheels 7, 7 and the non-driving wheels and thereby predict the road surface friction coefficient μ of a road surface on which the hybrid vehicle HV (see FIG. 1) is running.

With this configuration, the brake controller 14 (see FIG. 2) functions as a road surface prediction unit that predicts the road surface state (road surface friction coefficient μ) of a road surface on which the hybrid vehicle is running.

Also, the brake controller 14 functions as a skidding detection unit that detects on the basis of the rate of skidding that wheels including the driving wheels 7, 7 (see FIG. 1) and the non-driving wheels (not illustrated) skid.

In other words, the brake controller 14 can detect that skidding occurs in the hybrid vehicle HV (see FIG. 1) when the rate of skidding is greater than a predetermined level.

Such a predetermined level is determined on the basis of the characteristics of the hybrid vehicle HV and the like and may be configured through experimental measurements.

Furthermore, the brake controller 14 (see FIG. 2) according to this embodiment is configured to determine the road surface friction coefficient μ in three steps on the basis of two threshold values. One (first threshold value) of the two threshold values is a threshold value for making a determination as to a normal road surface and a low-μ road surface. The brake controller 14 makes a determination of a normal road surface if a predicted road surface friction coefficient μ is greater than the first threshold value, while it makes a determination of a low-μ road surface if a predicted road surface friction coefficient μ is smaller than the first threshold value.

The other (second threshold value) of the two threshold values is a threshold value for subdividing the low-μ road, which is smaller than the first threshold value. If a predicted road surface friction coefficient μ is smaller than the first threshold value, the brake controller 14 (see FIG. 2) makes a determination of a low-μ road 1 when the predicted road surface friction coefficient μ is greater than the second threshold value, while it makes a determination of a low-μ road 2 if the predicted road surface friction coefficient μ is smaller than the second threshold value.

The low-μ road 2 is a low-μ road having the road surface friction coefficient μ lower than the low-μ road 1. The low-μ road 1 is, for example, a wet paved road or an unpaved road, while the low-μ road 2 is an icy road.

The first threshold value by which the brake controller 14 (see FIG. 2) makes a determination of the normal road surface and the low-μ road can be treated as, for example, a lowest level of the road surface friction coefficient μ by which the hybrid vehicle HV (see FIG. 1) can assume running on the normal road surface. Also, The second threshold value by which the brake controller 14 makes a determination of the low-μ road 1 and the low-μ road 2 can be treated as, for example, a highest level of the road surface friction coefficient μ by which the hybrid vehicle HV can assume running on the icy road surface.

The first and second threshold values described above are characteristic values that are determined by the specification and characteristics of the hybrid vehicle HV, such as vehicle weight or the type and performance of tires to be mounted in the vehicle, and can be found in advance by experimental measurements and the like.

In response to a driver's request for emergency braking, the brake controller 14 (see FIG. 2) makes a determination of the degree of urgency depending on a rate of change in booster pressure. If the rate of change in booster pressure is higher than the urgency degree determination value described above, the brake controller 14 determines that the degree of urgency is high and performs the engine brake combination control.

In contrast, if the rate of change in booster pressure is lower than the urgency degree determination value described above, the brake controller 14 predicts the road surface friction coefficient μ on the basis of the rate of skidding calculated from the wheel speed of the driving wheels 7, 7 (see FIG. 1) and the non-driving wheels (not illustrated) and at the same time compares the thus predicted road surface friction coefficient μ with the first and second threshold values, thereby making a determination of the state of a road surface (normal road surface, low-μ road 1, or low-μ road 2). Next, the brake controller 14 performs the regenerative brake strengthening control for the determination of the normal road, the regenerative brake combination control for the determination of the low-μ road 1, and the regenerative brake deactivation control for the determination of the low-μ road 2.

As described above, the brake controller 14 (see FIG. 2) according to this embodiment predicts the degree of urgency and the road surface friction coefficient μ when determining that the driver makes a request for emergency braking. Then it selects and performs a brake assist control depending on the thus predicted degree of urgency and the road surface friction coefficient μ, thereby allowing the hybrid vehicle HV to effectively decelerate and come to a stop in response to a driver's request for emergency braking of the hybrid vehicle HV (see FIG. 1). Consequently, the braking distance associated with the emergency braking can be reduced. Also, the kinetic energy of the hybrid vehicle HV can be optimally recovered as electrical energy.

Steps in which the brake controller 14 (see FIG. 2) selects and performs brake assist controls are described below with reference to FIG. 7 (see FIGS. 1 to 6).

The brake controller 14 selects and performs the brake interlock control (step S10) when it does not make a determination of emergency braking ("No" in step S1) from the rate of change in booster pressure associated with the depression of the brake pedal 12 by the driver. In other words, as shown in FIG. 4A, the brake controller 14 controls the regenerative brake and the hydraulic brake on the basis of the target braking power BP1 to be calculated depending on the rate of change in booster pressure.

In contrast, the brake controller 14 determines the degree of urgency (step S2) when it makes a determination of emergency braking ("Yes" in step S1). For example, if the rate of change in booster pressure is higher than the urgency degree determination value, the brake controller 14 determines that the degree of urgency is high ("Yes" in step S2) and selects and performs the engine brake combination control (step S4).

The engine brake combination control is described below with reference to FIG. 8.

First, the brake controller 14 reduces a regenerative braking power (step S401). In this embodiment, the brake controller 14 notifies the engine controller 8 of the determination of emergency braking and the high degree of urgency. In response to this notification, the engine controller 8 sets the transmission 4*a* to the higher gear ratio (for example, set to the high gear ratio) and sets the driving motor 3 to the lower reduction ratio.

Also, the brake controller 14 switches the driving motor 3 to the generator (step S402). In this embodiment, the brake controller 14 notifies the motor controller 5 of the determination of emergency braking and the high degree of urgency. In response to this notification, the motor controller 5 switches the driving motor 3 to the generator.

The brake controller 14 activates the hydraulic brake (step S403) and causes the hydraulic brake to generate a friction braking power corresponding to a braking power which the regenerative braking power generated by the driving motor 3 with the transmission 4*a* set to the high gear ratio is short of for the maximum target braking power BP2.

Furthermore, the brake controller 14 engages the engine transfer shaft 20 (step S404) to make engine braking effective. In this embodiment, the engine controller 8 notified of the determination of emergency braking and the high degree of urgency controls the clutch 6 so as to engage the engine transfer shaft 20.

The brake controller 14 maintains this status ("No" in step S405) until the vehicle speed of the hybrid vehicle HV goes down below the regenerative lower limit speed Vlmt and deactivates the regenerative brake (step S406) when the vehicle speed of the hybrid vehicle HV goes down below the regenerative lower limit speed Vlmt ("Yes" in step S405). In this embodiment, the brake controller 14 notifies the engine controller 8 that the vehicle speed goes down below the regenerative lower limit speed Vlmt. In response to this notification, the engine controller 8 sets the transmission 4*a* to the neutral gear ratio. In addition, the brake controller 14 causes the wheel cylinder 11 to increase a hydraulic pressure that is input to the brake actuating unit Br so as to increase the friction braking power of the hydraulic brake to the target braking power BP2 (step S407).

The hybrid vehicle HV decelerates with the friction braking power by the hydraulic brake and finally comes to a stop.

Figure 8:
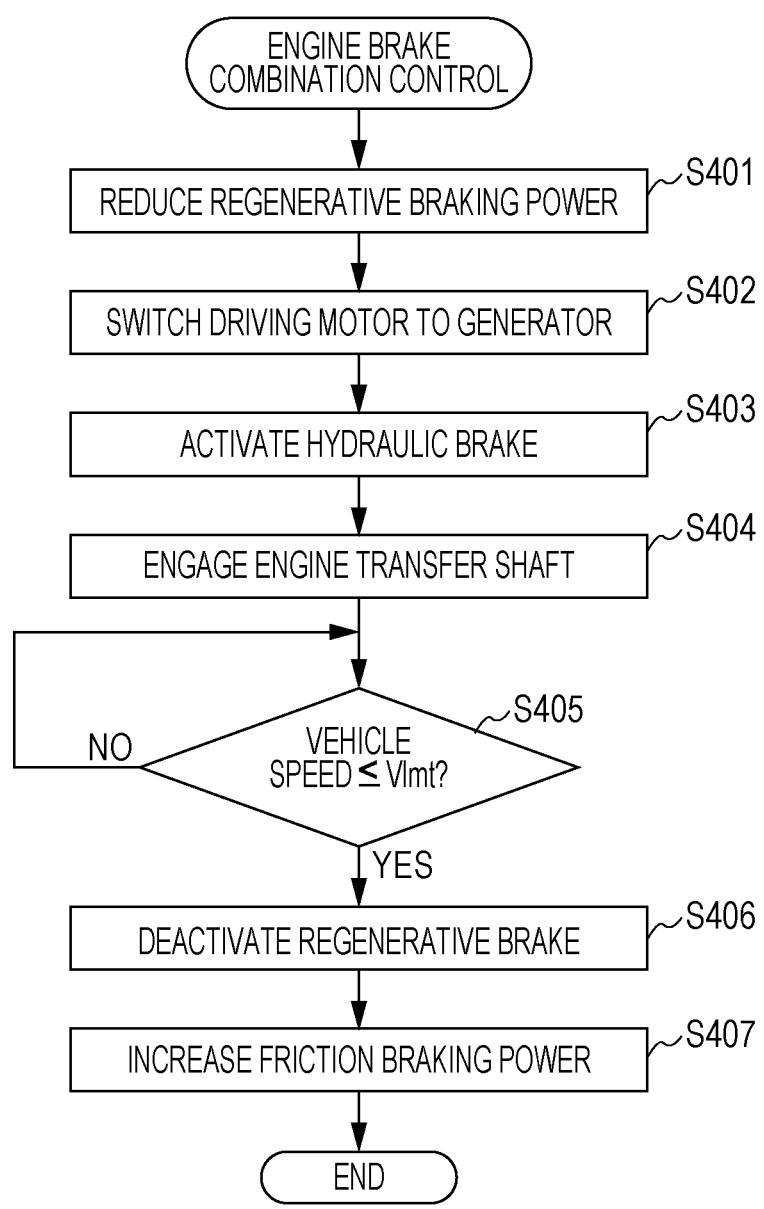
FIG. 8 is a flowchart showing steps for an engine brake combination control.

The brake controller 14 performs the engine brake combination control according to steps of FIG. 8.

As shown in FIG. 5B, when determining at time t2 that the degree of urgency of emergency braking is high, the brake controller 14 adds the engine braking power of the engine brake to the regenerative braking power of the regenerative brake and the friction braking power of the hydraulic brake and thereby slows down the hybrid vehicle HV. When the vehicle speed goes down below the regenerative lower limit speed Vlmt at time t3, the friction braking power by the hydraulic brake is used to decelerate the hybrid vehicle HV and bring it to a stop at time te.

As described above, during emergency braking of a high degree of urgency, the engine braking power of the engine brake is used to decelerate the hybrid vehicle HV with a great deal of braking power, thereby reducing the braking distance.

Figure 7:
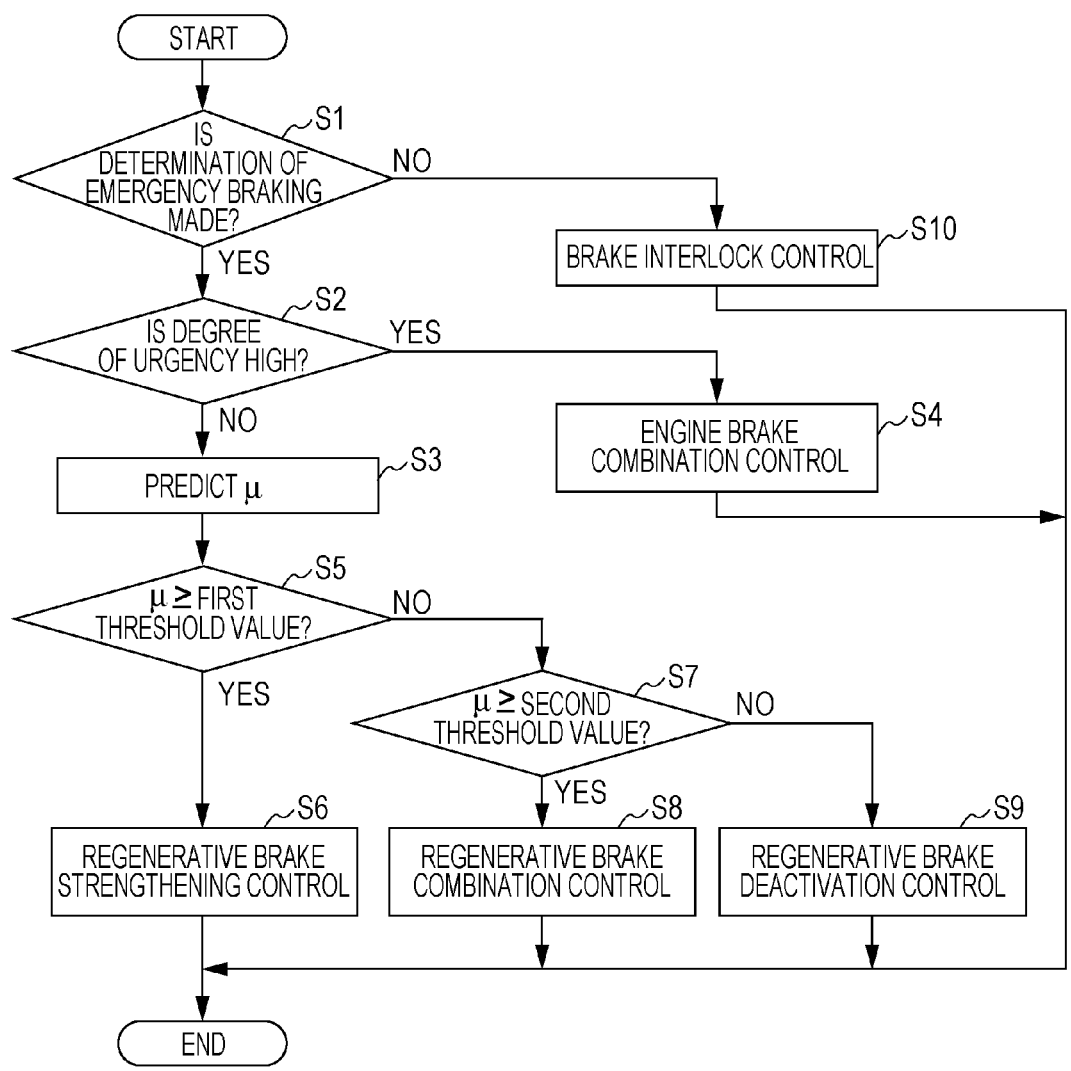
FIG. 7 is a flowchart showing steps in which a brake controller selects and performs a brake assist control.

Back to the description of step S2 of FIG. 7, the brake controller 14 makes a determination of a low degree of urgency ("No" in step S2) and predicts the road surface friction coefficient μ (step S3) when the rate of change in booster pressure is less than the urgency degree determination values.

As described above, the brake controller 14 predicts the road surface friction coefficient μ from a rate of skidding calculated on the basis of the rotational difference between the driving wheels 7, 7 (see FIG. 1) and the non-driving wheels (not illustrated). Then brake controller 14 compares the thus predicted road surface friction coefficient μ with the first threshold value (step S5).

If the thus predicted road surface friction coefficient μ is more than the first threshold value ("Yes" in step S5), the brake controller 14 makes a determination of a normal road surface and selects and performs the regenerative brake strengthening control (step S6).

The regenerative brake strengthening control is described with reference to FIG. 9.

First, the brake controller 14 increases a regenerative braking power (step S601). In this embodiment, the brake controller 14 notifies the engine controller 8 of the determination of emergency braking and the determination of the normal road surface. In response to this notification, the engine controller 8 sets the transmission 4*a* to the lower gear ratio (for example, sets to the low gear ratio) and sets the driving motor 3 to the higher reduction ratio.

Next, the brake controller 14 switches the driving motor 3 to the generator (step S602). As described above, in this embodiment, the brake controller 14 notifies the motor controller 5 of the determination of emergency braking and the determination of the normal road surface. In response to this notification, the motor controller 5 switches the driving motor 3 to the generator.

The brake controller 14 maintains this status ("No" in step S603) until the vehicle speed of the hybrid vehicle HV goes down below a predetermined speed level and reduces the regenerative braking power (step S604) when the vehicle speed of the hybrid vehicle HV goes down below the predetermined speed level ("Yes" in step S603). In this embodiment, the brake controller 14 notifies the engine controller 8 that the vehicle speed goes down below the predetermined speed level. In response to this notification, the engine controller 8 sets the transmission 4*a* to the higher gear ratio (for example, set to the high gear ratio) and sets the driving motor 3 to the lower reduction ratio.

The brake controller 14 activates the hydraulic brake (step S605) and causes the hydraulic brake to generate a friction braking power corresponding to a braking power which the regenerative braking power generated by the driving motor 3 with the transmission 4*a* set to the high gear ratio is short of for the maximum target braking power BP2.

The brake controller 14 maintains this status ("No" in step S606) until the vehicle speed of the hybrid vehicle HV goes down below the regenerative lower limit speed Vlmt and deactivates the regenerative brake (step S607) when the vehicle speed of the hybrid vehicle HV goes down below the regenerative lower limit speed Vlmt ("Yes" in step S606) and causes the wheel cylinder 11 to increase a hydraulic pressure which is input to the brake actuating unit Br so as to increase the friction braking power of the hydraulic brake to the target braking power BP2 (step S608).

The hybrid vehicle HV decelerates with the friction braking power of the hydraulic brake and finally comes to a stop.

Figure 9:
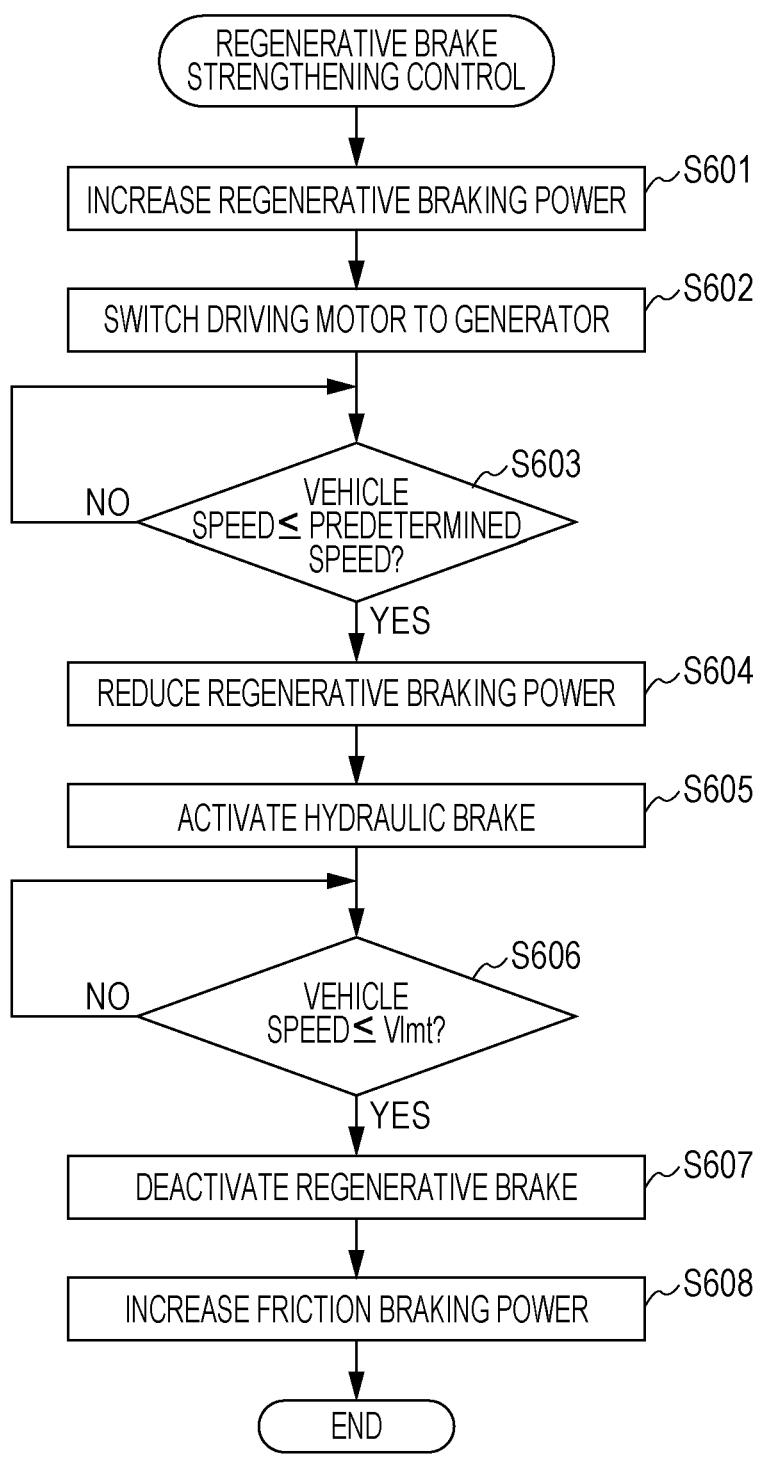
FIG. 9 is a flowchart showing steps for a regenerative brake strengthening control.

The brake controller 14 performs the regenerative brake strengthening control according to steps of FIG. 9.

As shown in FIG. 6, when making a determination of emergency braking and normal road surface at time t2, the brake controller 14 increases a regenerative braking power of the regenerative brake and thereby slows down the hybrid vehicle HV. When the vehicle speed goes down below the regenerative lower limit speed Vlmt at time t3, the friction braking power of the hydraulic brake is used to decelerate the hybrid vehicle HV and bring it to a stop at time te.

As described above, during emergency braking on a normal road surface, the regenerative braking power of the regenerative brake is increased to decelerate the hybrid vehicle HV with a great deal of braking power, thereby reducing the braking distance.

If the vehicle speed is higher than the first vehicle speed threshold value V1 when the regenerative braking power is increased in step S601, the engine controller 8 may be configured to set the transmission 4a to the middle gear ratio.

If the vehicle speed is higher than the second vehicle speed threshold value V2 when the regenerative braking power is increased in step S601, the engine controller 8 may be configured to set the transmission 4a to the middle gear ratio.

A predetermined speed at which the brake controller 14 reduces the regenerative braking power in step S603 is, for example, a speed V3 at time t2' of FIG. 6 and may be appropriately set on the basis of the braking requirement for the hybrid vehicle HV and driver's operational feeling and the like, as described above.

Back to the description of step S5 of FIG. 7, if the predicted road surface friction coefficient μ is less than the first threshold value ("No" in step S5), the brake controller 14 compares the predicted road surface friction coefficient μ with the second threshold value (step S7). If the predicted road surface friction coefficient μ is found to be more than the second threshold value ("Yes" in step S7), the brake controller 14 makes a determination of the low-μ road 1 and selects and performs the regenerative brake combination control (step S8).

The regenerative brake combination control is described below with reference to FIG. 10.

First, the brake controller 14 reduces a regenerative braking power (step S801). As described above, in this embodiment, the brake controller 14 notifies the engine controller 8 of the determination of emergency braking and low-μ road 1. In response to this notification, the engine controller 8 sets the transmission 4a to the higher gear ratio (for example, set to the high gear ratio) and sets the driving motor 3 to the lower reduction ratio.

Also, the brake controller 14 switches the driving motor 3 to the generator (step S802). As described above, in this embodiment, the brake controller 14 notifies the motor controller 5 of the determination of emergency braking and low-μ road 1. In response to this notification, the motor controller 5 switches the driving motor 3 to the generator.

The brake controller 14 activates the hydraulic brake (step S803) and causes the hydraulic brake to generate a friction braking power corresponding to a braking power which the regenerative braking power generated by the driving motor 3 with the transmission 4a set to the high gear ratio is short of for the maximum target braking power BP2.

The brake controller 14 maintains this status ("No" in step S804) until the vehicle speed of the hybrid vehicle HV goes down below the regenerative lower limit speed Vlmt and deactivates the regenerative brake (step S805) when the vehicle speed of the hybrid vehicle HV goes down below the regenerative lower limit speed Vlmt ("Yes" in step S804) and causes the wheel cylinder 11 to increase a hydraulic pressure which is input to the brake actuating unit Br so as to increase the friction braking power of the hydraulic brake to the target braking power BP2 (step S806).

The hybrid vehicle HV decelerates with the friction braking power of the hydraulic brake and finally comes to a stop.

Figure 10:
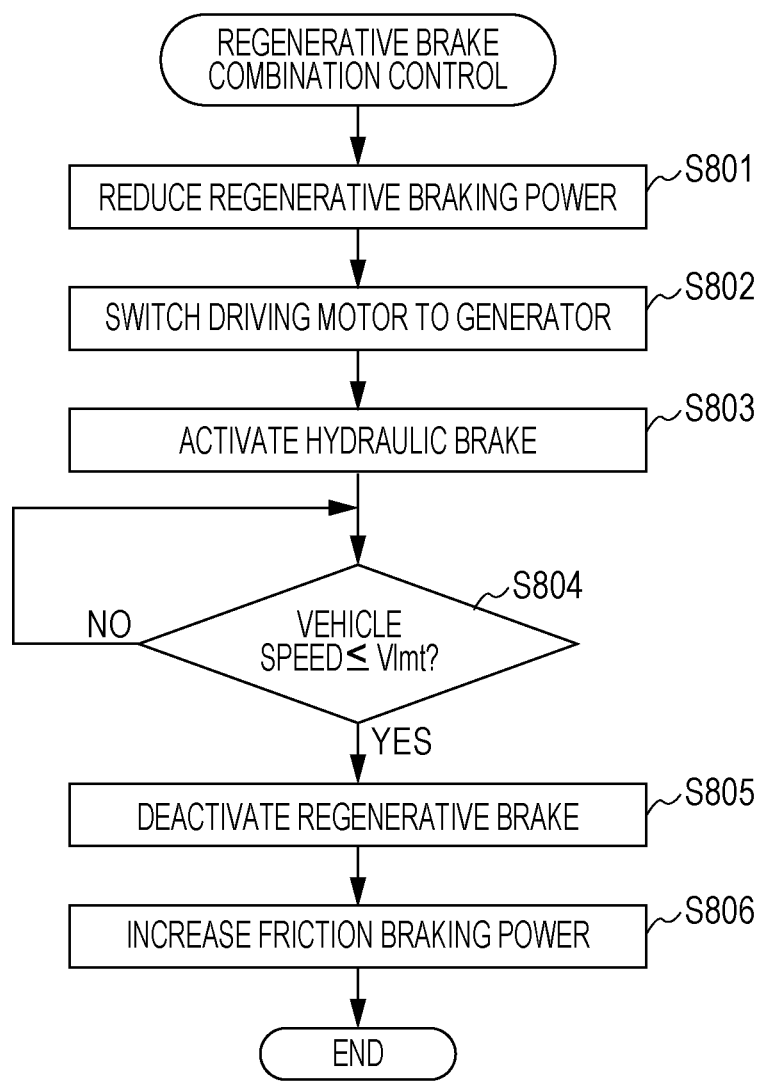
FIG. 10 is a flowchart showing steps for a regenerative brake combination control.

The brake controller 14 performs the regenerative brake combination control according to steps of FIG. 10.

As shown in FIG. 5A, when making a determination of emergency braking and low-μ road 1 (wet paved road or the like) at time t2, the brake controller 14 causes the regenerative brake to generate a regenerative braking power at lower levels as well as causes the hydraulic brake to generate a friction braking power so as to produce a braking power corresponding to the maximum target braking power BP2 and thereby slow down the hybrid vehicle HV. When the vehicle speed goes down below the regenerative lower limit speed Vlmt at time t3, the friction braking power of the hydraulic brake is used to decelerate the hybrid vehicle HV and bring it to a stop at time te.

As described above, during emergency braking on a low-μ road 1 (wet paved road or the like), the hydraulic brake normally produces a friction braking power. Accordingly, controlling a hydraulic pressure input to the brake actuating unit Br with the ABS function of the brake controller 14 can prevent the driving wheels 7, 7 (see FIG. 1) and the non-driving wheels (not illustrated) from locking up and skidding, thereby allowing the hybrid vehicle HV to be kept stable while it is being urgently braked.

Back to the description of step S7 of FIG. 7, if the predicted road surface friction coefficient μ is less than the second threshold value ("No" in step S7), the brake controller 14 makes a determination of the low-μ road 2 and selects and performs the regenerative brake deactivation control (step S9).

The regenerative brake deactivation control is described below with reference to FIG. 11.

The brake controller 14 deactivates the regenerative brake (step S901) and activates the hydraulic brake (step S902) and causes the hydraulic brake to produce a friction braking power corresponding to the maximum target braking power BP2.

Figure 11:
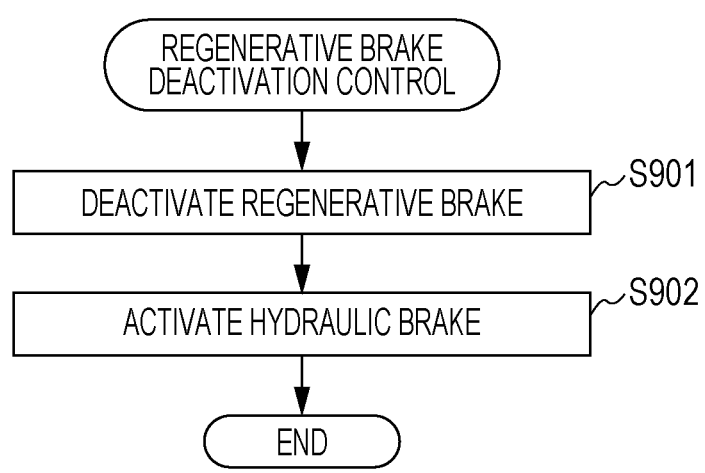
FIG. 11 is a flowchart showing steps for a regenerative brake deactivation control.

The brake controller 14 performs the regenerative brake deactivation control according to steps of FIG. 11.

As shown in FIG. 4B, when making a determination of emergency braking and low-μ road 2 (icy paved road or the like) at time t2, the brake controller 14 deactivates the regenerative brake and causes the hydraulic brake to produce a friction braking power corresponding to the maximum target braking power BP2. The hybrid vehicle HV decelerates with the friction braking power generated by the hydraulic brake and comes to a stop at time te.

As described above, during emergency braking on a low-μ road 2 (icy road or the like), the hybrid vehicle HV decelerates only with a friction braking power produced by the hydraulic brake. Accordingly, the hybrid vehicle HV can be effectively kept stable under the hydraulic control provided by the ABS function of the brake controller 14, thereby allowing the hybrid vehicle HV to be urgently braked in a stable manner even on a slippery road surface, such as an icy road surface.

As described above, when the driver depresses the brake pedal 12 (see FIG. 2), the vehicle braking apparatus 1 (see FIG. 1) provided in the hybrid vehicle HV (see FIG. 1) according to this embodiment can select and perform one of the brake interlock control, the regenerative brake deactivation control, the regenerative brake combination control, the engine brake combination control, and the regenerative brake strengthening control.

For example, in response to a driver's request for emergency braking, the brake controller 14 (see FIG. 2) can select and perform one of the brake assist controls, depending on the degree of urgency and the state of a road surface (road surface friction coefficient μ). This allows the hybrid vehicle HV (see FIG. 1) to be kept stable even on a low-μ road until it optimally decelerates and comes to a stop.

In addition, the regenerative brake can also be utilized, which allows the kinetic energy of the hybrid vehicle HV to be recovered as electrical energy. Accordingly, the energy efficiency of the hybrid vehicle HV can be improved.

The criteria which the brake controller 14 (see FIG. 2) uses to select one of the brake interlock control, the regenerative brake deactivation control, the regenerative brake combination control, the engine brake combination control, and the regenerative brake strengthening control are not limited to the presence of a request for emergency braking, the degree of urgency, and the state of a road surface described in this embodiment.

For example, when the hybrid vehicle HV (see FIG. 1) is heavy in vehicle weight (weight based on passenger capacity and/or load capacity) or the driver depresses the brake pedal 12 (see FIG. 2) at high speeds, the brake controller 14 may be configured to select the regenerative brake combination control, the engine brake combination control, and the regenerative brake strengthening control so as to produce a great deal of braking power.

Alternatively, if the brake controller 14 (see FIG. 2) determines that the brake pad (not illustrated) of the brake actuating unit Br (see FIG. 1) becomes worn to a large degree, the regenerative brake combination control, the engine brake combination control, and the regenerative brake strengthening control may be selected so as to generate a great deal of braking power, thereby preventing the brake pad from further wearing. In this case, the brake controller 14 may be configured to make a determination of brake pad wear on the basis of, for example, a period of time since the installation (or replacement) of the brake pad (not illustrated).

The present invention is typically described with reference to the foregoing preferred embodiments. Various modifications are conceivable within the scope of the present invention.

For example, as described above, the brake controller 14 (see FIG. 2) can detect that the hybrid vehicle HV (see FIG. 1) skids.

If the initiation condition for a brake assist control (the regenerative brake combination control, the engine brake combination control, and the regenerative brake strengthening control) is met, the engine controller 8 (see FIG. 1) may be configured to set the gear ratio of the transmission 4a (see FIG. 1) so as to generate the regenerative braking power at lower levels when the brake controller 14 detects that the hybrid vehicle HV (see FIG. 1) skids.

Specifically, if the initiation condition for a brake assist control is met, the engine controller 8 shown in FIG. 1 sets the transmission 4a to the higher gear ratio and sets the driving motor 3 to the lower reduction gear ratio when the brake controller 14 (see FIG. 2) detects that the hybrid vehicle HV skids. For example, the transmission 4a is set to the high gear ratio.

With this configuration, the regenerative braking power generated by the driving wheels 7, 7 become less, thereby reducing a tire lock-up and skidding of the driving wheels 7, 7.

If the initiation condition for a brake assist control is met, the engine controller 8 may be configured to set the transmission 4a to the neutral gear when the brake controller 14 (see FIG. 2) detects that the hybrid vehicle HV (see FIG. 1) skids.

Alternatively, if the initiation condition for a brake assist control is met, the motor controller 5 may be configured to run the driving motor 3 in the normal rotational direction when the brake controller 14 detects that the hybrid vehicle HV skids.

This configuration also results in a reduction in a regenerative braking power generated in the driving wheels 7, 7, thereby reducing a tire lock-up and skidding of the driving wheels 7, 7.

Obviously, numerous modifications and variations of the present invention are possible in light of the above teachings. It is therefore to be understood that within the scope of the appended claims, the invention may be practiced otherwise than as specifically described herein.

What is claimed is:

1. A vehicle braking system comprising:
an electric motor to drive a driving wheel via a reduction ratio setting device to change a reduction ratio between the electric motor and the driving wheel;
an operating amount detector configured to detect an amount of operation of a brake operating member;
a brake assist controller to boost a braking power based on a target braking power that is set depending on the amount of operation detected by the operating amount detector, when an initiation condition for a brake assist control is met;
a first braking device to make the electric motor generate a first braking power under regenerative control; and
a second braking device to generate a second braking power by actuating an actuator with an operating fluid to be pressurized through a hydraulic pressure source,
wherein, when the initiation condition for the brake assist control is met, the reduction ratio setting device sets the reduction ratio so as to reduce the first braking power and then suspends a change in the reduction ratio, the first braking device generates the first braking power as well as the second braking device generates the second braking power to produce the target braking power.

2. The vehicle braking system according to claim 1, further comprising:
a skidding detector configured to detect a skidding of a vehicle,
wherein, when the initiation condition for the brake assist device is met, the reduction ratio setting device sets the reduction ratio so as to reduce the first braking power if the skidding detector detects the skidding of the vehicle.

3. The vehicle braking system according to claim 1,
wherein the brake assist controller predicts a degree of urgency and a friction coefficient of a road surface, and performs the brake assist control depending on the degree of urgency and the friction coefficient of the road surface.

4. A vehicle braking system comprising:
an electric motor to drive a driving wheel via a reduction ratio setting device to change a reduction ratio between the electric motor and the driving wheel;
an operating amount detector configured to detect an amount of operation of a brake operating member;
a brake assist controller to boost a braking power based on a target braking power that is set depending on the amount of operation detected by the operating amount detector, when an initiation condition for a brake assist control is met;
a first braking device to make the electric motor generate a first braking power under regenerative control; and
a second braking device to generate a second braking power by actuating an actuator with an operating fluid to be pressurized through a hydraulic pressure source,
wherein, when the initiation condition for the brake assist control is met, no shifting is currently taking place or occurring, the reduction ratio setting device sets the reduction ratio so as to increase the first braking power, and the first braking device generates the first braking power and the second braking device generates the second braking power to produce the target braking power.

5. The vehicle braking system according to claim 4, further comprising:
a skidding detector configured to detect a skidding of a vehicle,
wherein, when the initiation condition for the brake assist device is met, the reduction ratio setting device sets the reduction ratio so as to reduce the first braking power if the skidding detector detects the skidding of the vehicle.

6. The vehicle braking system according to claim 4,
wherein the brake assist controller predicts a degree of urgency and a friction coefficient of a road surface, and performs the brake assist control depending on the degree of urgency and the friction coefficient of the road surface.

7. A vehicle braking system comprising:
an electric motor to drive a driving wheel;
an internal combustion engine to drive the driving wheel;
a reduction ratio setting device to change a reduction ratio between the electric motor and the driving wheel and to change a reduction ratio between the internal combustion engine and the driving wheel;
a clutch to engage and to disengage the internal combustion engine and the reduction ratio setting device;
an operating amount detector configured to detect an amount of operation of a brake operating member;
a brake assist controller to boost a braking power based on a target braking power that is set depending on the amount of operation detected by an operating amount detector, when an initiation condition for a brake assist control is met;
a first braking device to make the electric motor generate a first braking power under regenerative control; and
a second braking device to generate a second braking power by actuating an actuator with an operating fluid to be pressurized through a hydraulic pressure source,
wherein, when the initiation condition for the brake assist control is met, the first braking device generates the first braking power and the second braking device generates the second braking power so as to produce the target braking power, and the internal combustion engine and the reduction ratio setting device are engaged with each other through the clutch, and
wherein, when the initiation condition for the brake assist control is met, the reduction ratio setting device sets the reduction ratio so as to reduce the first braking power and then suspends a change in the reduction ratio.

8. The vehicle braking system according to claim 7,
wherein, when the initiation condition for the brake assist control is met, the internal combustion engine and the reduction ratio setting device remain engaged if the internal combustion engine is running.

9. The vehicle braking system according to claim 7, further comprising:
a skidding detector configured to detect a skidding of a vehicle,
wherein, when the initiation condition for the brake assist device is met, the reduction ratio setting device sets the reduction ratio so as to reduce the first braking power if the skidding detector detects the skidding of the vehicle.

10. The vehicle braking system according to claim 7,
wherein the brake assist controller predicts a degree of urgency and a friction coefficient of a road surface, and performs the brake assist control depending on the degree of urgency and the friction coefficient of the road surface.

* * * * *